(12) United States Patent  (10) Patent No.: US 7,581,507 B2
Kern  (45) Date of Patent: Sep. 1, 2009

(54) LAUNCH AND RECOVERY DEVICES FOR WATER VEHICLES AND METHODS OF USE

(75) Inventor: Fred Robert Kern, Lexington, MA (US)

(73) Assignee: Physical Sciences, Inc., Andover, MA (US)

( * ) Notice: Subject to any disclaimer, the term of this patent is extended or adjusted under 35 U.S.C. 154(b) by 0 days.

(21) Appl. No.: 11/773,242

(22) Filed: Jul. 3, 2007

(65) Prior Publication Data

US 2008/0202405 A1 Aug. 28, 2008

Related U.S. Application Data

(60) Provisional application No. 60/903,528, filed on Feb. 26, 2007.

(51) Int. Cl.
*B63B 35/40* (2006.01)

(52) U.S. Cl. .................. 114/259; 114/256; 114/258

(58) Field of Classification Search .......... 114/254, 114/256, 258, 259, 263, 70
See application file for complete search history.

(56) References Cited

U.S. PATENT DOCUMENTS

| | | | | |
|---|---|---|---|---|
| 2,370,916 A | * | 3/1945 | Reedy Sr. ............... | 114/259 |
| 2,568,330 A | * | 9/1951 | Flippin ................. | 114/70 |
| 3,448,712 A | * | 6/1969 | Adams Jr. et. al. ...... | 114/259 |
| 3,508,510 A | * | 4/1970 | Frankel ................ | 114/260 |
| 3,596,623 A | | 8/1971 | Frankel | |
| 4,055,138 A | | 10/1977 | Klein | |
| 4,444,425 A | | 4/1984 | Miller et al. | |
| 4,445,719 A | | 5/1984 | Miller et al. | |
| 4,648,782 A | | 3/1987 | Kraft | |
| 5,253,605 A | | 10/1993 | Collins | |
| 5,683,130 A | | 11/1997 | Pheifer | |
| 5,941,192 A | * | 8/1999 | Tavone et al. ........... | 114/256 |
| 6,178,914 B1 | * | 1/2001 | Axelsson ................ | 114/253 |

(Continued)

FOREIGN PATENT DOCUMENTS

DE 92 17 605 3/1993

(Continued)

OTHER PUBLICATIONS

Partial International Search Report for International Application No. PCT/EP2008/054954 (2 pages), 2008.

*Primary Examiner*—Lars A Olson
(74) *Attorney, Agent, or Firm*—Proskauer Rose LLP

(57) ABSTRACT

An embodiment of a launch/recovery device for both surface and underwater vehicles includes a plurality of driven wet-traction members arranged to form a low drag (e.g., water flow-through) ramp design. The wet-traction members provide traction even when wet between the water vehicle and the launch/recovery device. As a result of utilizing driven wet-traction members, the use of conventional hoists, special capture devices such as hooks and tow lines, and personnel located within the water to attach the capture devices to the water vehicle is eliminated. The wet-traction members provide both strength and flexibility to the launch/recovery device. That is, while the wet-traction members are strong enough to support the weight of the water vehicle, they are at the same time flexible enough to deflect a distance (e.g., about 6 to 15 inches) to accommodate a soft landing of the water vehicle on the ramp, while providing recovery forces and motion.

40 Claims, 33 Drawing Sheets

U.S. PATENT DOCUMENTS

| | | |
|---|---|---|
| 6,390,012 B1 | 5/2002 | Watt et al. |
| 6,502,527 B1 | 1/2003 | Danielson |
| 6,600,695 B1 | 7/2003 | Nugent |
| 6,779,475 B1 * | 8/2004 | Crane et al. .................. 114/258 |
| 6,843,198 B1 * | 1/2005 | Witbeck ...................... 114/258 |
| 7,156,036 B2 * | 1/2007 | Seiple ......................... 114/254 |
| 2004/0028511 A1 | 2/2004 | Eaton |
| 2005/0257731 A1 | 11/2005 | Bouchaud et al. |

FOREIGN PATENT DOCUMENTS

| | | |
|---|---|---|
| DE | 195 00 182 | 7/1996 |
| GB | 1 585 865 | 3/1981 |
| WO | WO 2004/103804 | 12/2004 |

* cited by examiner

| MATERIAL | 6-INCH DEFLECTION GOAL | | | 12-INCH DEFLECTION GOAL | | |
|---|---|---|---|---|---|---|
| | SLAT DIMENSIONS (INCHES) | WEIGHT PER SLAT (lbs) | STRESS (ksi) | SLAT DIMENSIONS | WEIGHT | STRESS |
| AL7075 Sy = 73ksi | HOLLOW 12 x 3; t = 1/4 | 125 lbs | 38 (1.9 SF) | HOLLOW 11 x 2; t = 3/8 | 160 lbs | 52 (1.4 SF) |
| AL7075 Sy = 73ksi | HOLLOW 7.5 x 3; t = 3/8 | 120 lbs | 45 (1.6 SF) | HOLLOW 4 x 3; t = 3/8 | 83 lbs | 75 EXCEED YIELD |
| HY STEEL Hy = 100ksi | HOLLOW 7.5 x 2; t = 3/8 | 325 lbs | 65 (1.5 SF) | HOLLOW 4.5 x 2; t = 1/4 | 150 lbs | EXCEED HY YIELD |
| HIGHT-YIELD STEEL Hy = 100ksi | HOLLOW 9.5 x 2; t = 3/8 | 275 lbs | 80 (1.25 SF) | STEEL IS TOO STIFF | | |
| COMPOSITE Sy = 140ksi | SOLID 6 x 2.5 | 150 lbs | 50 (2.8 SF) | SOLID 6 x 2 | 150 lbs | 75 (1.9 SF) |
| COMPOSITE Sy = 140ksi | SOLID 11.5 x 2 | 225 lbs | 40 (3.5 SF) | SOLID 6 x 2 | 150 lbs | 75 (1.9 SF) |
| COMPOSITE Sy = 140ksi | HOLLOW 6 x 3; t = 3/8 | 62 lbs | 55 (2.5 SF) | HOLLOW 8 x 2; t = 3/8 | 69 lbs | 73 (1.95 SF) |
| COMPOSITE Sy = 140ksi | HOLLOW 7 x 3; t = 1/4 | 45 lbs | 61 (2.3 SF) | HOLLOW 10 x 2; t = 1/4 | 73 lbs | 78 (1.80 SF) |

FIG. 4C

| MATERIAL | DIMENSIONS | MAX DEFLECTION (INCHES) | BENDING STRESSING (ksi) | YIELD STRESS (ksi) |
|---|---|---|---|---|
| COMPOSITE | Do = 3.75<br>Di = 2.5 | 12.25 | 120 | 140 |
| COMPOSITE | Do = 4.5<br>Di = 4 | 13.1 | 154 | 140 |
| AL 7075 | Do = 4.5<br>Di = 3.5 | 7.5 | 77.6 | 75 |
| AL 7075 | Do = 5.5<br>Di = 5 | 6.3 | 65.2 | 75 |

FIG. 16

LAUNCH AND RECOVERY DEVICES FOR WATER VEHICLES AND METHODS OF USE

RELATED APPLICATIONS

This application claims priority to U.S. provisional application Ser. No. 60/903,528, filed on Feb. 26, 2007, and entitled "Launch and Recovery Devices for Water Vehicles and Methods of Use." The disclosure of U.S. provisional application Ser. No. 60/903,528 is hereby incorporated by reference in its entirety.

GOVERNMENT RIGHTS

At least a portion of the subject matter of the present application was made with Government support under Contract No. N00024-05-C-4147 awarded by the Department of Defense. The Government may have certain rights.

FIELD OF THE INVENTION

The invention relates generally to launch and recovery devices for water vehicles. In some embodiments, the invention more particularly relates to launch and recovery devices that do not require the use of a tether between a host ship and a water vehicle during launch and/or recovery. In certain embodiments, the invention relates to launch and recovery devices that may launch or recover a plurality of different types of water vehicles, including manned or unmanned, surface or underwater vehicles at a variety of speeds and sea conditions.

BACKGROUND OF THE INVENTION

Water vehicles, such as manned surface vehicles (e.g., 7 meter or 11 meter rigid hull inflatable boats), unmanned surface vehicles (e.g., Spartan Scout USV), manned underwater vehicles (e.g., Seahorse Submarine available from Seahorse Submarines Inc., Stuart, Fla.), and unmanned underwater vehicles (e.g., REMUS or BPAUV) are generally launched from and recovered to a host ship. Typical apparatus currently employed to launch or recover water vehicles includes hoists and slings or other containers adapted to a specific type of water vehicle.

One of the common concerns during launching or recovering water vehicles is damage to the vehicles themselves or injury to personnel involved in the launch or recovery procedure. For example, damage to the water vehicle or injury to personnel can occur at the ocean/atmosphere interface where rough waves can generate large mechanical forces on a launching or recovered water vehicle. As a result, water vehicles are typically not launched or recovered during a storm or under the influence of rough seas. Damage or injury may also result as the sling or other type of container responds to waves resulting in the vehicle being slammed against the structure of the host ship or personnel. Damage or injury may also result from differences in speeds between the host ship and the launched/recovered water vehicle as well as differences in speeds between the host ship and the apparatus used to launch or recover vehicles. In addition, injury can occur to personnel, especially personnel located in the ocean or other water body (e.g., divers), during attachment of a tether line from the hoist to the water vehicle, or during other guiding, stabilizing, or attachment procedures. Specifically, personnel may be injured by becoming tangled in the tether line or through interactions with a water vehicle during the launch or recovery process. Additional damage or injury can occur when a water vehicle comes in contact with a rigid ramp, especially when vertical motion of the vehicle and a host ship are not substantially similar.

Another common problem with conventional launch and recovery apparatuses are their size, complexity, and cost. For example, conventional launch and recovery apparatuses are in general adapted in size and shape to specific types of water vehicles. As a result, not all launch and recovery apparatuses can be used to launch or recover a plurality of different types of water vehicles. In general, conventional launch and recovery apparatuses are designed to launch or recover a specific water vehicle. As a result, host ships are dedicated to launching or recovering only a certain type of water vehicle, thereby increasing the costs of launch or recovery processes. Moreover, conventional launch and recovery apparatuses include multiple large parts (e.g., hoist, sling, or container) that take up a lot of space on the host ship, are complex to operate, and may require divers in the water (especially for unmanned water vehicles) for many applications.

SUMMARY OF THE INVENTION

The invention, in one embodiment, features devices and methods for launching and/or recovering water vehicles. In general, the devices and methods described below do not require the use of a tether, such as a line to guide and/or pull the water (e.g., marine) vehicle on or off board a host ship. Rather, in most embodiments the devices and methods are untethered (i.e. there is no line connecting a hoist to the recovered or launched water vehicle). In addition, embodiments of the methods and devices described herein provide for water passage through the launch and recovery device. As a result, the devices described herein are less susceptible to wave interactions that result in damage to the water vehicle and/or injury to personnel. Thus, the launch and recovery devices and methods may be used in a variety of sea conditions including rough or stormy seas and under a variety of operating speeds (e.g., the recovered vehicle can approach the launch and recovery device at a high speed, such as 5 knots or more) In addition, the launch and recovery devices and methods described herein can be used while the host vessel is moving forward, with the recovered vehicle approaching at a somewhat higher speed, without the host vessel having to stop. In the past, the host vessel would have to stop to accommodate divers in the water used to help recover a water craft. Devices and methods of the present invention do not have to include stoppage of the host vehicle because the devices and methods do not require the use of divers in the water. In certain embodiments, the relative approach speed of a recovered vessel could be 5 knots, with the host vessel moving at 10 knots and the recovered vehicle moving at 15 knots. Moreover, embodiments of the invention provide a flexible, deflectable launching/recovery surface which can accommodate a plurality of different types of water vehicles. In addition, the flexible, deflectable launching/recovery surface eliminates or significantly minimizes damage to the water vehicle by providing a flexible, deflectable surface to create soft landings and launchings. In addition, embodiments of the methods and devices described herein provide a multiple axis pivotable connection between the launch and recovery device and a host ship/vessel to allow for the device to follow wave motions for easier launches and recoveries.

In one aspect, the invention relates to a water vehicle launch and recovery device that includes a pair of spaced side rails, a plurality of wet-traction members extending at least a portion of the distance between the pair of spaced side rails, and a device to drive translation or rotation of the plurality of wet-traction members. The plurality of wet-traction members include a material (e.g., an elastomeric material such as nitrile-based rubber or other non-slip materials such as non-skid flooring or stair treads of waterproof coarse grit sandpaper) that can prevent and/or minimize slippage at the interface between the device and a water vehicle, even when the water vehicle and/or the device is wet. The plurality of wet-traction members are arranged between the side rails to provide a plurality of apertures that allow water to pass through the device. The plurality of apertures comprise from about 10% to about 80% of the surface area in a plane defined between the pair of side rails.

This aspect of the invention can include one or more of the following features. The wet-traction members can be formed, at least in part, of a material having a surface roughness of at least about 0.05 inches. The wet-traction members can include an inner support member and an elastomeric covering on an exterior surface of the inner support member. For example, the elastomeric covering (e.g., a rubber covering or rubber alternative material) can be positioned on one or more exterior surfaces (e.g., upper surface, lower surface), or alternatively, on all exterior surfaces of the inner support member. The elastomeric covering can be formed, at least in part, of a nitrile based rubber. The elastomeric covering can be textured to provide protuberances. The protuberances can provide additional grip and in some embodiments can act as water drain passages. The inner support member of the wet-traction member can be formed of an elemental metal, an alloy, or a composite material. The composite material can include fibers, such as, for example, glass fibers, polymer fibers, carbon fibers, and carbon nanotubes. These fibers can be used to reinforce a polymer material such as, for example, epoxy, vinylester, or polyester resins. In some embodiments, the inner support member is formed of one or more ropes or cables (e.g., a plurality of ropes or cables positioned parallel to one another or just a single rope, cable, or wire). The ropes or cables can be formed from fibers, such as aromatic polyester fibers (e.g., Vectran™ fibers, commercially available from Kuraray America, Inc., of New York, N.Y.), carbon fibers, steel fibers, and glass fibers. The ropes or cables can be formed of steel wire and in some embodiments the inner support member is formed from a single wire or monofilament. The wet traction members can be arranged to form a v-shape between the pair of spaced side rails. In some embodiments, the launch and recovery device can further include side retainers that extend vertically from the side rails. These side retainers can be made, at least in part, of plastic or metal sheets. Alternatively, each side retainer can include an open mesh supported on a foldable frame (e.g., foldable perimeter frame). A removable floating net can be attached to the side retainers or to the pair of spaced side rails.

In another aspect, the invention relates to a water vehicle launch and recovery device that includes a ramp having a forward portion and an aft portion. The ramp includes a plurality of traction members for supporting at least a portion of a water vehicle. The water vehicle launch and recovery device also includes a hinged or pivotable connector (e.g., a dual, two axis pivotable connector, or a three axis, possibly spherical connector) for attaching the forward portion of the ramp to a vessel used in a launch or recovery process, and two or more floatation devices attached to the aft portion of the ramp for controlling the angle of deployment or depth relative to the water surface. The floatation devices reduce lift of a lower end of the ramp relative to waves and heave motion of the vessel. In addition, the floatation devices provide a reduction in relative heave of the aft end of the ramp relative to the water's surface in the ship's wake. The floatation devices allow the ramp to take on a pitch angle depending on the ship's motion and thus allowing the ramp to maintain its aft end at a desired depth under the water's surface. In certain embodiments, the floatation devices enhance the yaw motion of the ramp to allow the ramp to follow the side to side motion of the wake, and act as guides to provide guiding forces directing the surface vehicle to the ramp. In one embodiment, the ramp further includes support cables that extend from the host ship to the ramp or from the floatation devices to the aft portion of the ramp. These support cables are used to control the depth of the aft portion of the ramp in the water (i.e., control an angle of deployment of the ramp).

This aspect of the invention can include one or more of the following features. The wet-traction members can be formed, at least in part, of a material having a surface roughness of at least about 0.05 inches. The wet-traction members can include an inner support member and an elastomeric covering (e.g., a rubber covering) on an exterior surface of the inner support member. For example, the elastomeric covering can be positioned on one or more exterior surfaces (e.g., upper surface, lower surface), or alternatively, on all exterior surfaces of the inner support member. The elastomeric covering can be formed, at least in part, of a nitrile based rubber. The elastomeric covering can be textured to provide protuberances. The inner support member of the wet-traction member can be formed of an elemental metal, an alloy, or a composite material. The composite material can include fibers, such as, for example, glass fibers, polymer fibers, carbon fibers, and carbon nanotubes. These fibers can be used to reinforce a polymer material such as, for example, epoxy, vinylester, or polyester resins. In some embodiments, the inner support member is formed of one or more ropes or cables. The ropes or cables can be formed from fibers, such as aromatic polyester fibers (e.g., Vectran™ fibers), carbon fibers, steel fibers, and glass fibers. The ropes or cables can be formed from steel wire. In some embodiments, the launch and recovery device can further include side retainers that extend vertically from the side rails. These side retainers can be made, at least in part, of plastic or metal sheets, or open meshes or screens. A removable floating net can be attached to the side retainers or to the pair of spaced side rails.

In another aspect, the invention relates to a vessel for water vehicle launch and recovery. The vessel includes a hull, an extendable ramp, and a connector. The hull has a forward portion, an aft portion, and a longitudinal axis extending between the forward and aft portions. The extendable ramp includes a plurality of spaced traction members that can support at least a portion of a water vehicle. The connector attaches the extendable ramp to the aft portion of the vessel and allows the ramp to be rotatably positioned at an angle between about 0 degrees and 50 degrees from the longitudinal axis. In some embodiments, the ramp attaches to the forward portion of the hull instead of the aft portion.

This aspect of the invention can include one or more of the following features. Each one of the plurality of spaced traction members can include an inner support member and an elastomeric covering on an exterior surface of the inner support member. For example, the elastomeric covering can be positioned on one or more exterior surfaces (e.g., upper surface, lower surface), or alternatively, on all exterior surfaces of the inner support member. The elastomeric covering can be formed, at least in part, of a nitrile based rubber. The ramp can include side retainer that extend vertically from the ramp. In some embodiments, the ramp can include a device to drive translation or rotation of the plurality of spaced traction members. In addition, the device (i.e., a translation drive) can include a brake to control speed of translation or rotation of the plurality of spaced traction members.

In another aspect, the invention relates to a method of recovering a water vehicle from a body of water. The method includes positioning a ramp extended from a hull of a recovery vessel at an incline of about 0 degrees to about 40 degrees (e.g., about 5 to 35 degrees; about 10 to about 35 degrees for an underwater marine vehicle; about 5 to about 25 degrees for a surface marine vehicle), the ramp including a plurality of spaced traction members; lowering a portion of the ramp into the body of water; and supplying power to the plurality of spaced traction members to lift the water vehicle from the body of water. In certain embodiments, the water vehicle is lifted from the water without the use of a tow line (e.g., a tether). In other embodiments, a tether is attached as a security measure, but the water vehicle is lifted by the plurality of spaced traction members.

Some embodiments of this aspect of the invention can feature activating a homing signal connected to the ramp to allow the water vehicle to better direct itself to the ramp. The homing signal can be an acoustical signal, an electromagnetic signal, or other type of homing signal. Certain embodiments of this aspect of the invention can feature raising side retainers attached to the ramp to retain the water vehicle on the ramp during recovery.

In another aspect, the invention relates to a water vehicle launch and recovery device that includes a pair of spaced side rails, a plurality of wet-traction members extending at least a portion of the distance between the pair of spaced side rails, and a device to drive translation or rotation of the plurality of wet-traction members. Each of the plurality of wet-traction members is flexible so as to provide a soft landing for a recovered water vehicle. In some embodiments, a portion of the plurality of wet-traction members provide about 10 to 15 inches (e.g., 12 inches) of deflection under loading of the recovered vehicle.

The above aspects of the invention can include one or more of the following advantages. In certain embodiments, injury to personnel and damage to water vehicles is eliminated or substantially minimized due to at least one of: (1) a lack of a tow line, (2) deflectable, wet-traction members, and (3) a low drag, water flow-through ramp design. Due to the size and design of the ramp, launch/recovery devices in accordance with the invention can accommodate a wide variety of different water vehicles, thereby eliminating a need for a dedicated host vessel and/or type of recovery mechanism for each particular type of water vehicle. In addition, the launch/recovery devices provide space and operational efficiencies by eliminating the use of complex and bulky components such as hoists, cranes, custom frames, slings, and carriers. Moreover, due to a low drag, water flow-through design, the launch/recovery device can be used even in stormy (high wave-ramp interaction) conditions. In addition, the launch and/or recovery process can be controlled by a computer or other operational system, thereby increasing the speed and accuracy of these procedures and reducing or eliminating the number of personnel used.

BRIEF DESCRIPTION OF THE DRAWINGS

In the drawings, like reference characters generally refer to the same parts throughout the different views. Also, the drawings are not necessarily to scale, emphasis instead being placed upon illustrating the principles of the invention.

FIG. 4C is a table providing possible dimensions for an inner support member of the wet-traction member.

FIG. 16 is a table providing possible dimensions for a portion of the wet-traction member of FIG. 14 for various materials.

DESCRIPTION

Figure 1:
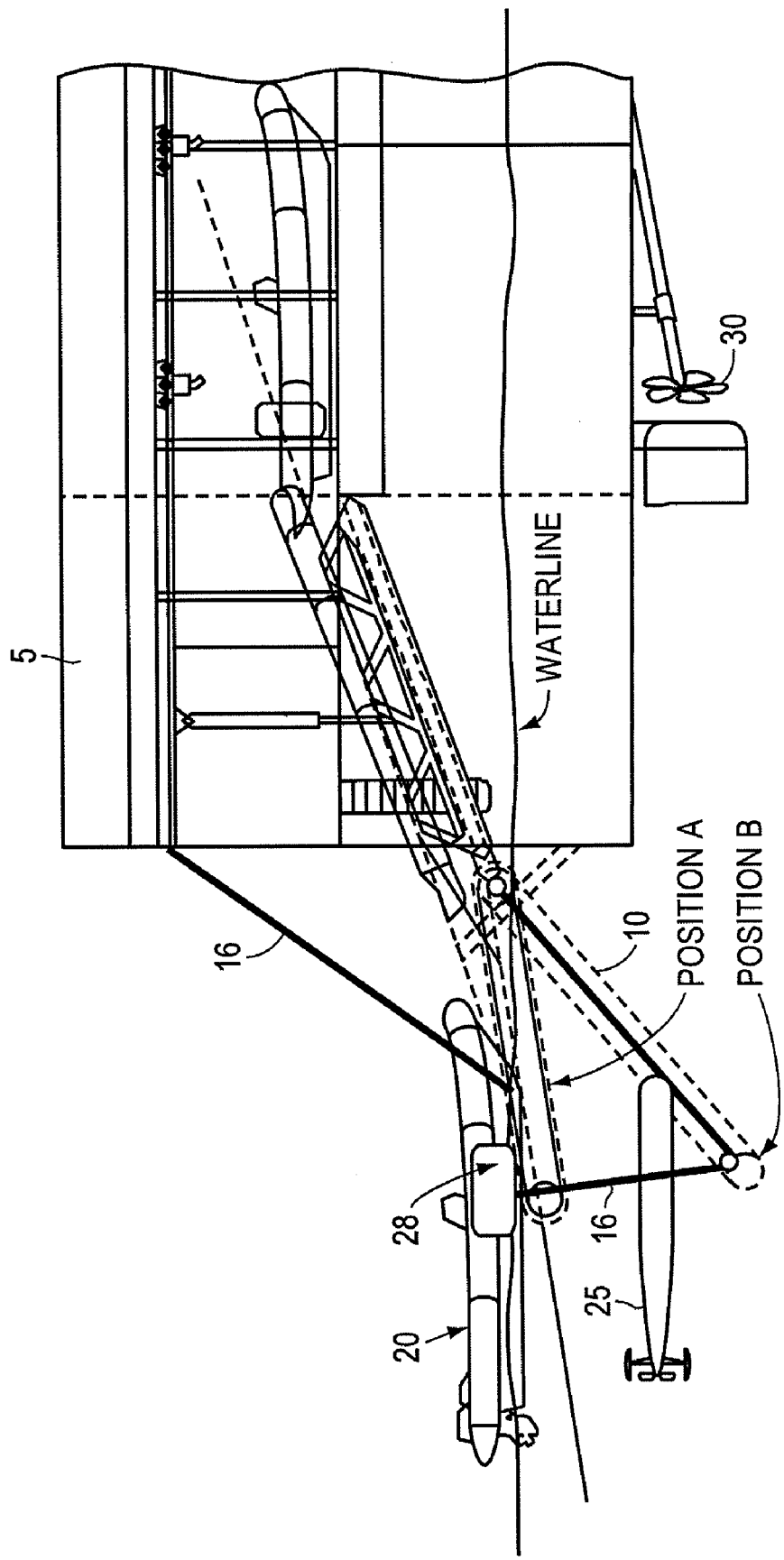
FIG. 1 is a cross sectional view of a vessel or host ship looking to port from just starboard of the starboard hull of a multi-hull vessel, or from the starboard side of a mono-hull vessel.

Now turning to the drawings, FIG. 1 shows a cutaway view of a vessel or host ship 5 looking to port from just starboard of the port hull of a multi-hull vessel, or from the starboard side of a mono-hull vessel. The vessel 5 includes a launch/recovery device 10 that can pivot through means of a hinged connector to provide a plurality of different launching or recovery positions. For example, the launch/recovery device 10 can be positioned through an adjustment of connector to launch or recover a surface water vehicle 20 as represented by position A. In addition, through further adjustment of connector, the launch/recovery device 10 can be angled to position B to recover an underwater vehicle 25. In some embodiments, a depth adjusting or support cable 16 from the host ship 5 or a flotation device 28 is used to control and/or secure the position and angle of the device 10. The launch/recovery processes shown in FIG. 1 do not use a tow line to pull or guide the water vehicles 20, 25 up or down the launch/recovery device (i.e., ramp) 10. Rather, these processes are controlled automatically through translation or rotation of wet-traction members forming a portion of the launch/recovery device 10. (The wet-traction members provide a non-slip grip even when wet and are shown in greater detail in FIGS. 2A-2D). As a result of not using a tow line, the launch and recovery processes can occur without personnel (e.g., divers) positioned in the water, thereby increasing the safety of the operations. In addition, in certain embodiments, such as the embodiment shown in FIG. 1, the launch/recovery device 10 can be positioned to block an approaching water vehicle's 20, 25 path to prevent it from contacting or getting tangled with the vessel's propeller 30 or rudder.

Figure 2A:
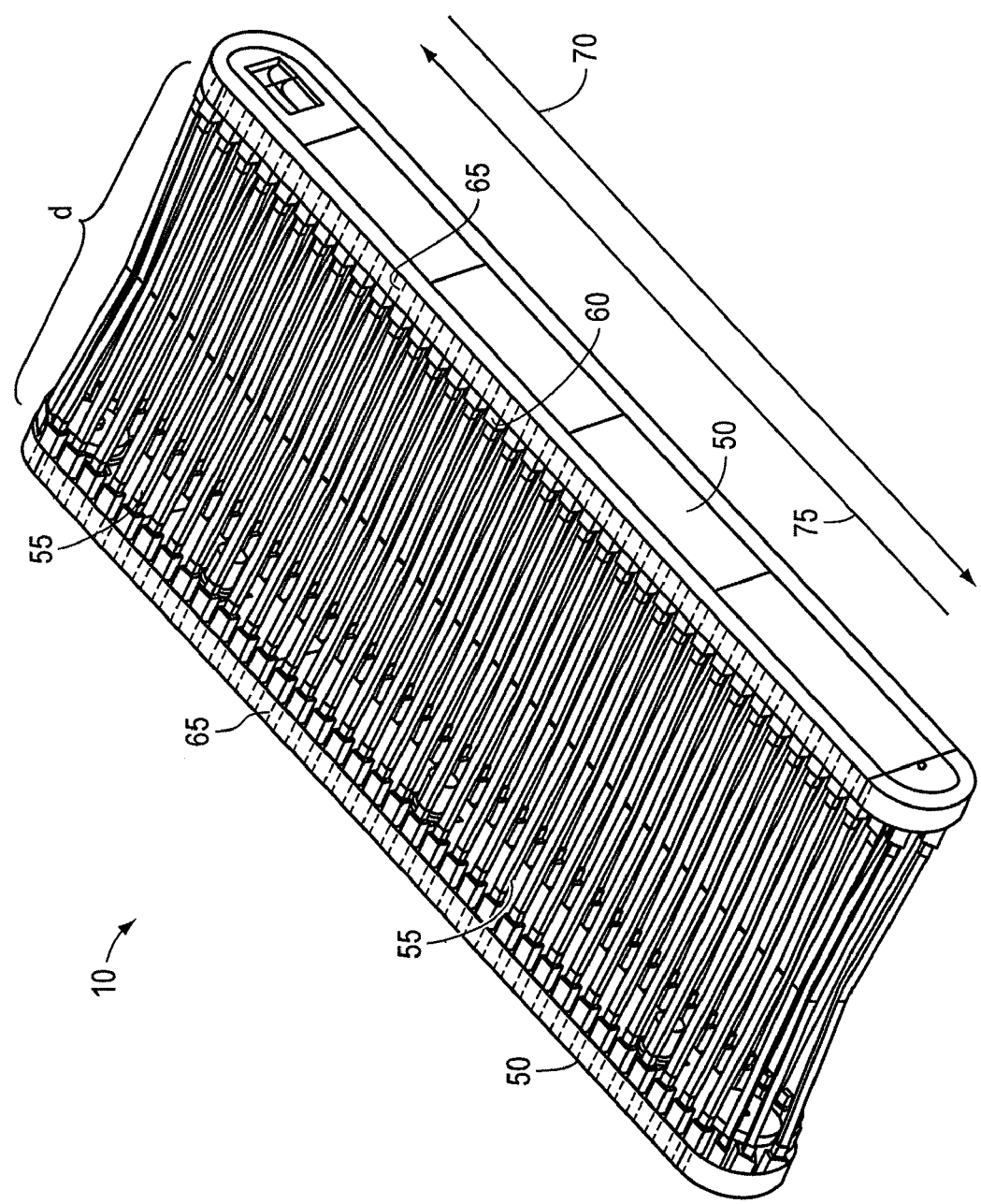
FIG. 2A is a perspective view of an embodiment of a launch/recovery device.
Figure 2B:
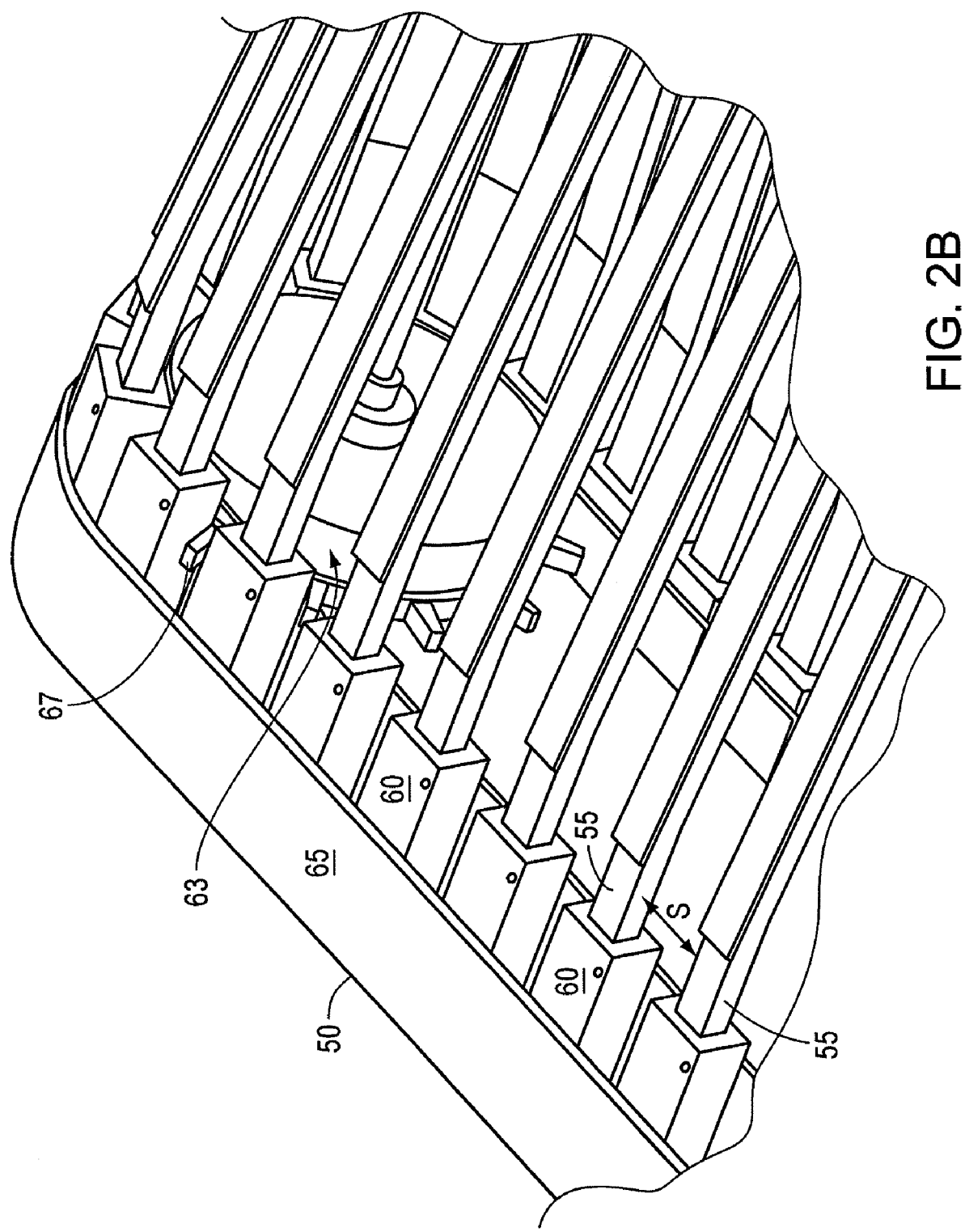
FIG. 2B is an enlarged perspective view of the device of FIG. 2A showing a driving end of the device with a powered (e.g., toothed) wheel.
Figure 2C:
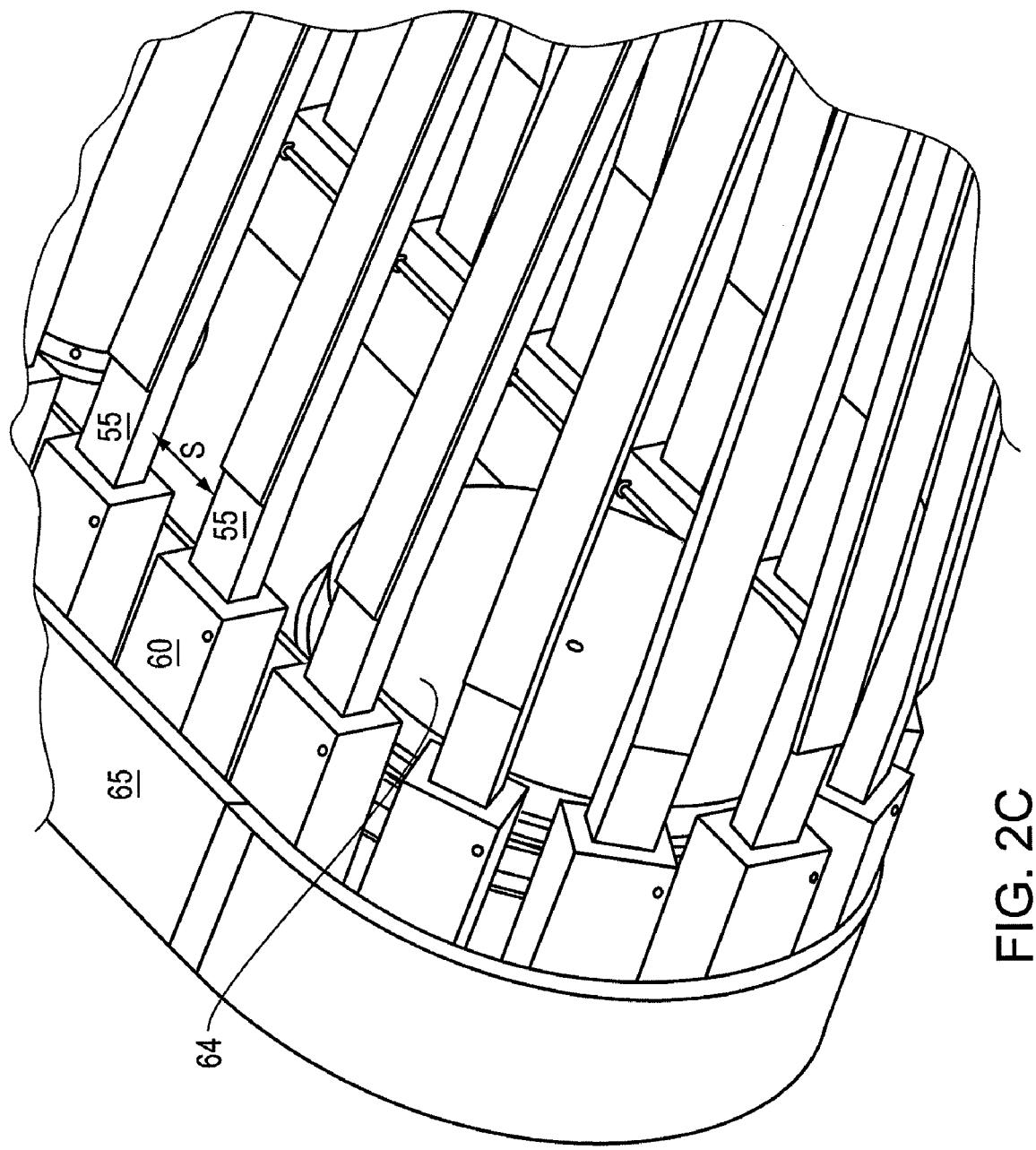
FIG. 2C is an enlarged perspective view of the device of FIG. 2A showing a lower end of the device with a follower wheel.
Figure 2D:
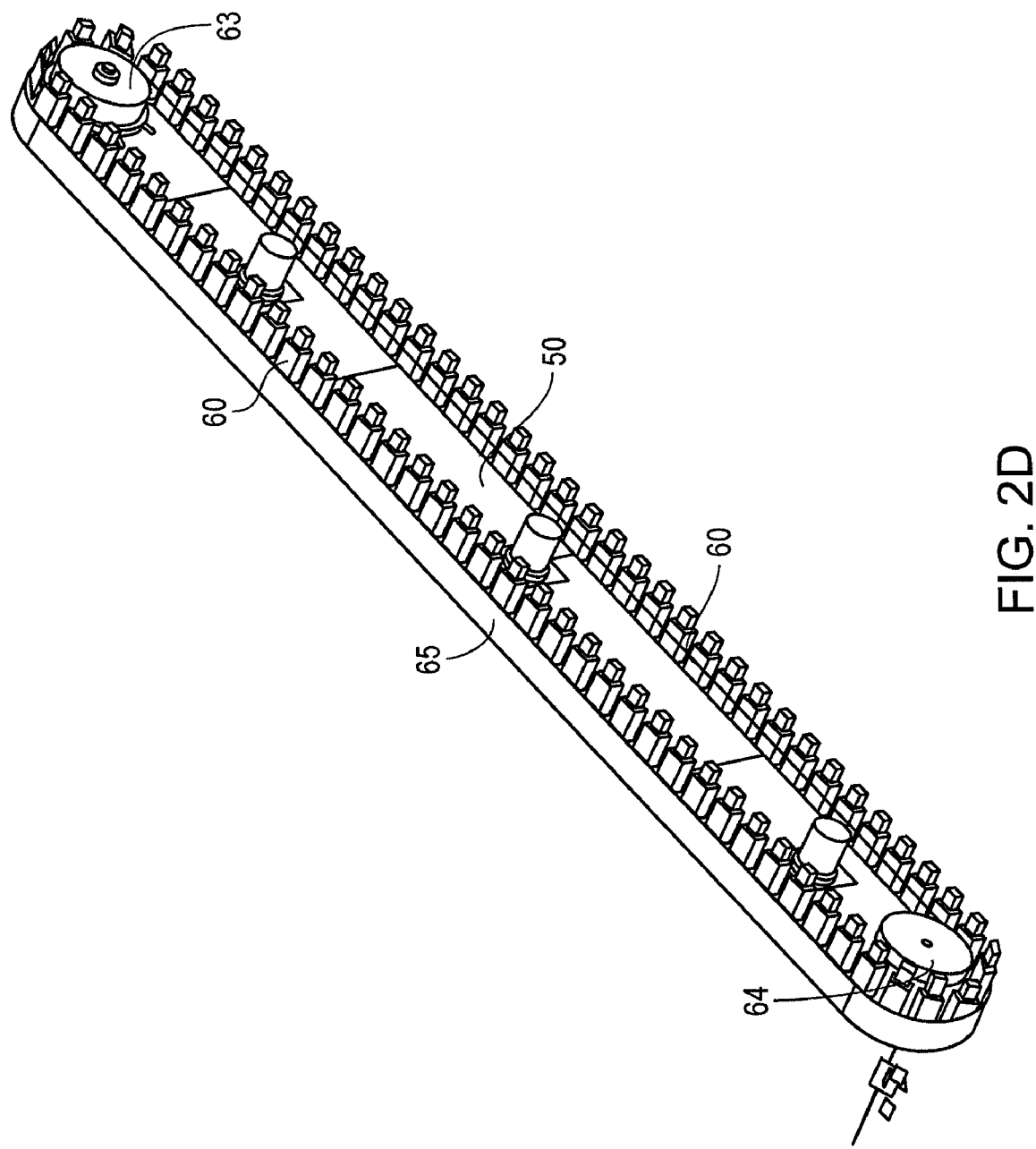
FIG. 2D is a perspective view of a side rail of the device of FIG. 2A.

FIGS. 2A-2D show an embodiment of a launch/recovery device 10. The embodiment illustrated in FIGS. 2A-2D is referred to as the slat embodiment or slat configuration system. FIG. 2A shows a perspective view of this embodiment of the launch/recovery device 10, including load bearing slats extending from one side rail to the other and fitted with high wet-traction material for a recovered vessel to ride on (i.e., wet-traction members), and low friction sliders. The slats and sliders are pulled along a belt path by cables on both sides, synchronized by driven toothed wheels located at a forward or driving end of the ramp 10. (See FIG. 2B showing the driving end of the ramp with a powered wheel 63.) FIG. 2C shows the lower or aft end of the device 10 with a follower roller 64 that does not use/need teeth. FIG. 2D is a perspective view of the left side rail portion of the launch/recovery device 10. Referring to FIGS. 2A-2D, the launch/recovery device 10 includes a pair of spaced side rails 50 and a plurality of wet-traction members 55 that extend distance (d) between the pair of spaced side rails 50. The wet-traction members 55 are each connected to sliders 60 driven by a cable or a belt 65 to provide translation of the plurality of wet-traction members 55 in either a launch direction 70 or a recovery direction 75. As shown in FIGS. 2B and 2C, the plurality of wet-traction members 55 are spaced (s) so as to form apertures that water can pass through. In certain embodiments the plurality of wet-traction members 55 are spaced (s) such that the surface area defined between the two spaced side rails 50 includes about 10% aperture area and the remaining 90% surface area is defined by the plurality of wet-traction members 55. In other embodiments, the plurality of wet-traction members 55 are spaced such that the surface area defined between the two space side rails includes about 60% aperture area and the remaining ~40% of the surface area is defined by the plurality of wet-traction members. Other combinations are also possible, for example about 30% of the surface area may be defined by aperture area and about 70% of the surface area may be defined by wet-traction members 55. In another embodiment, about 80% of the surface area is defined by aperture area and about 20% of the surface area is defined by wet-traction members 55.

Figure 3A:
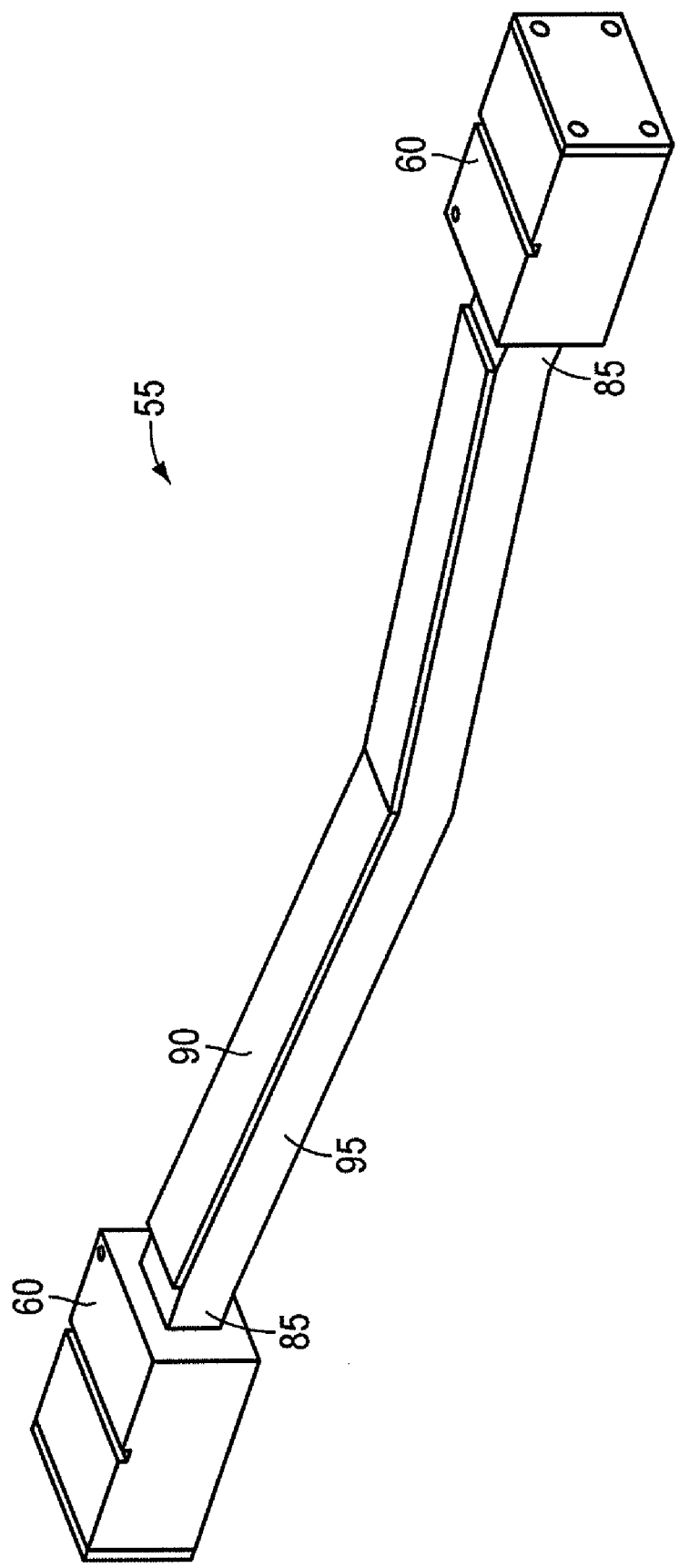
FIG. 3A is a perspective view of a single wet-traction member.
Figure 3B:
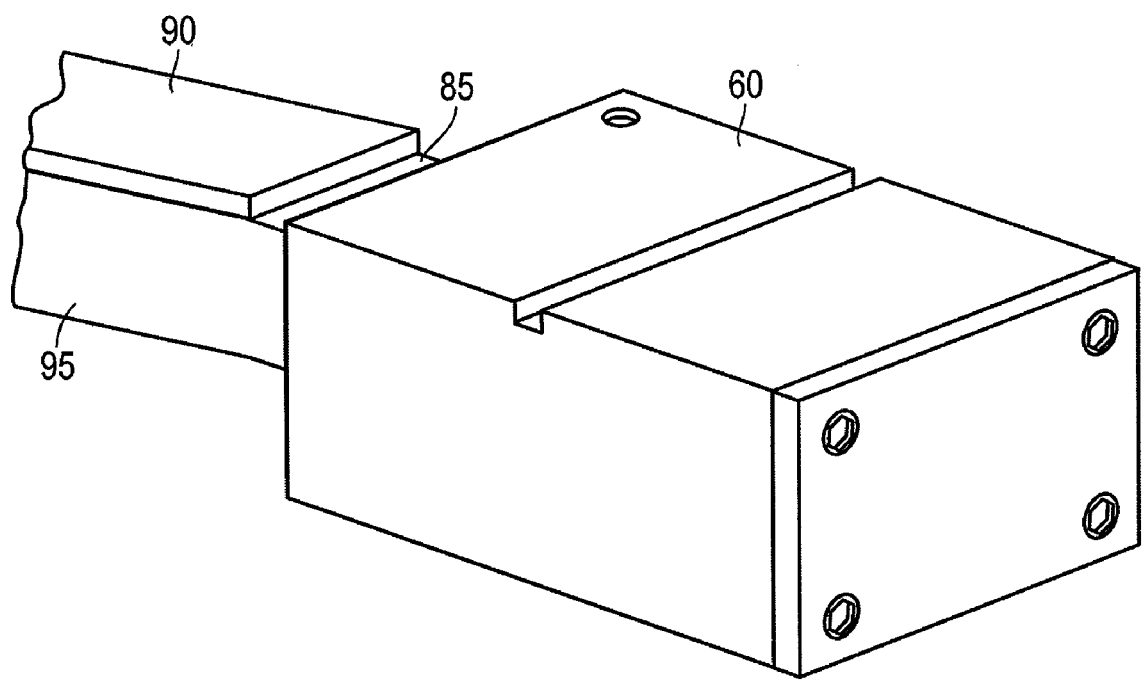
FIG. 3B is an enlarged perspective view of an end portion of the wet-traction member of FIG. 3A.

FIGS. 3A and 3B show one of the plurality of wet-traction members 55 of the launch/recovery device 10. The wet-traction member 55 shown in FIG. 3A is formed of a bar that includes a v-shape within a center portion 80 (some embodiments do not include the v-shape). FIG. 3A shows a complete traction member 55 and its end sliders 60, and FIG. 3B shows an embodiment of how a slider may be constructed from an extrusion and end cap formed from a low friction material, such as, for example, UHMW (ultra-high molecular weight) polyethelene. Without wishing to be bound by theory, it is believed that the v-shape provides vehicle-centering on the ramp capabilities, especially for round vehicles. End portions 85 are not bent and are inserted into sliders 60 that are attached to the cable or belt 65 to provide translation of the wet-traction members 55. In the embodiment shown in FIGS. 3A and 3B, the wet-traction member 55 includes an outer wet-traction providing layer 90 and a support member 95 defining a hollow opening. In this embodiment, the wet-traction providing layer 90 is provided on a top (i.e., upper) surface of the inner support member 95 (i.e., the wet-traction providing layer 90 is provided on a surface that contacts the launched/recovered vessel and does not surround the entirety of the support member 95). However, in other embodiments, the wet-traction layer 90 covers some portion of the top and one or more of the bottom surface, and side surfaces of the support member 95.

The outer wet-traction providing layer 90 is formed of a material that can provide traction (i.e., prevent/minimize slippage) between the launch/recovery device 10 and the water vehicle 20 or 25 even when wet. As a result, no tow line is required to pull or guide the water vehicle 20 or 25 up or down the launch/recovery device 10 at least because the launch/recovery device includes means for gripping the water vehicle and moving it along the inclined path. The wet-traction providing layer 90 can be formed of a material that has a surface roughness of at least about 0.05 inches (e.g., 0.07 inches, 0.2 inches). In some embodiments, the wet-traction providing layer 90 can be textured to include raised protuberances, ridges, or forms such as micro-siping that provide additional grip. An example of a material that can provide wet-traction is an elastomer, such as a rubber, especially a nitrile-based rubber. Another example includes sandpaper.

The support member 95 is formed of a material that is strong enough so as to be able to support the weight of a water vehicle 20 or 25, but at the same time is flexible enough to deflect under the weight of the water vehicle to provide a soft landing or interaction between the water vehicle and the launch/recovery device 10. In some embodiments, it is possible that a combination of 10, 20, or more wet-traction members 55 support the entirety of the weight of the water vehicle 20 or 25 when it is completely out of the water. In other embodiment, it is desired that a combination of three traction members 55 support the entirety of the water vehicle 20 or 25 during initial contact with the ramp. In embodiments in which the combination of three wet-traction members supports the entirety of the weight of the water vehicles 20 or 25, it has been determined that the wet-traction members 55 can deflect a distance of about 6 inches to about 1 foot in direction D shown on FIG. 4A. Examples of some suitable materials include light weight metals (e.g., such as aluminum) and composite materials (i.e., the combination of two or more different material) that include at least one of the following categories of materials: fibers, nanotubes, epoxies (e.g, reinforced epoxies), and polymers (e.g., vinylester or polyester). Other suitable materials include ropes or cables formed of a plurality of fibers, such as a plurality of oriented fibers (e.g., carbon fibers, or glass fibers) that are arranged to form the support member 95.

Figure 4A:
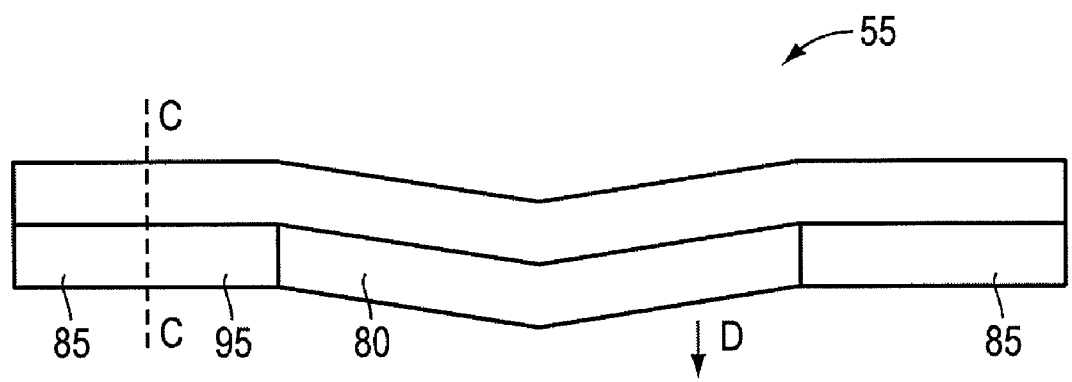
FIG. 4A is another perspective view of the wet-traction member.
Figure 4B:
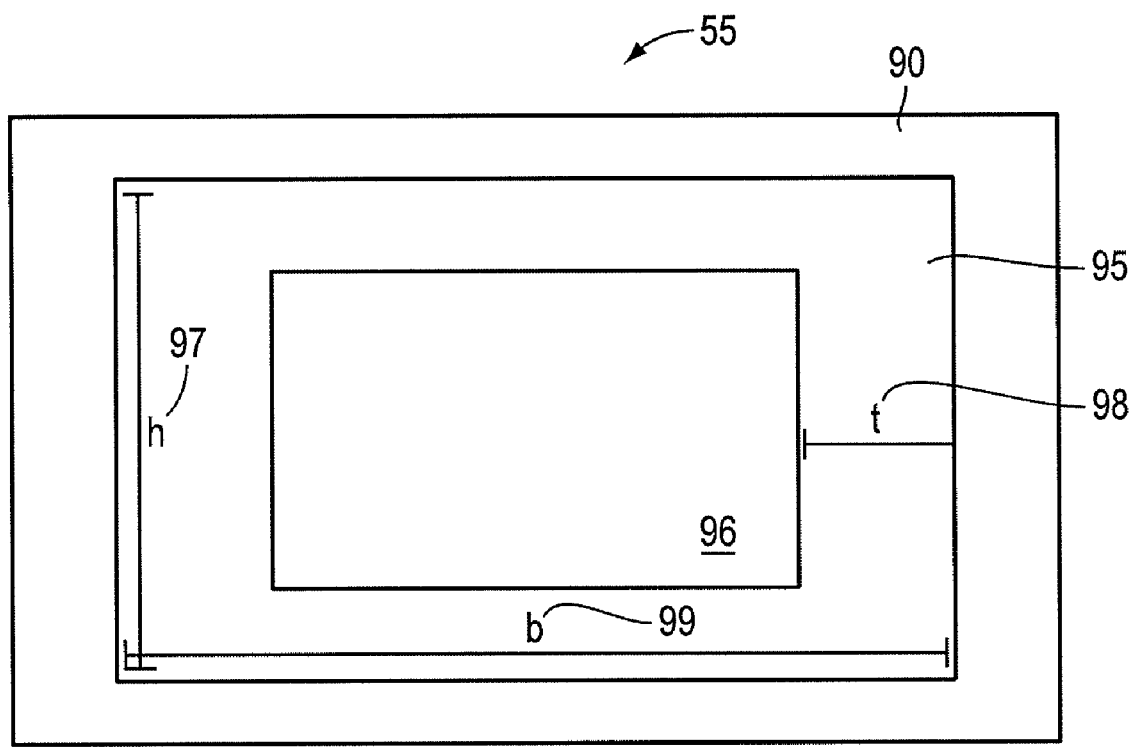
FIG. 4B is a cross sectional view taken along line CC in FIG. 4A of the wet-traction member.

In the embodiments shown in FIGS. 3A, 4A and 4B, the wet-traction member 55 has a hollow interior (i.e., the hollow opening 96—see FIG. 4B). Without wishing to be bound by theory, it is believed that an increase in deflection and a decrease in weight can be achieved by providing a member 55 with a hollow interior, while maintaining strength of the member 55. For example, in the embodiment shown in FIGS. 4A and 4B, the support member 95 is formed of aluminum and is surrounded on all four sides by the wet-traction providing layer 90. (FIG. 4A shows a perspective view of the member 55 and FIG. 4B shows a cross-sectional view of member 55 taken along line CC shown in FIG. 4A.) By providing a hollow interior, the wet-traction member is lighter in weight and achieves greater deflection under load than a solid member. The bending stress of a hollow bar is defined by the following equation:

$$\sigma = \frac{FLh}{2I} \quad \text{(Eq. 1)}$$

wherein F is equal to the downward force applied to the member 95, L is equal to the distance (d) between the two spaced rails 50, h is equal to the height of the support member 95, and I is the moment of inertia of the member 95. The moment of inertia for a hollow beam is dependent upon the height (h) 97 of the support member 95, the thickness (t) 98 of the support member 95, and the width (b) 99 of the support member 95. In embodiments, the dimensions of h, t, and b are selected such that the bending stress a applied to three or less wet-traction members 55 is less than a yield stress of the wet-traction member 55. For example, in certain embodiments, h, t, b, and L are selected such that when the entire weight of a water vehicle is positioned on three or more wet-traction members 55 the traction members 55 deflect but do not yield.

In general, deflection, 6, of the traction members 55 (i.e., inner support members 95) shown in FIGS. 3A and 3B can be described according to:

$$\delta = \frac{FL^3}{48EI} \quad \text{(Eq. 2)}$$

In certain embodiments, it is desired to have a deflection of at least about 6 inches. In other embodiments, it is desired to have a deflection of a foot or more (e.g., 15 inches). For example, in an embodiment in which a 6 inch deflection is desired for a combination of three members 55 to support a 22,000 lbs weight, an aluminum (7075) inner support member 95 can be designed to have a 15 feet L, a 3 inch h, a 3 inch b, a ¼ of an inch t. This particular aluminum inner support member 95 would weigh about 125 lbs and would have a bending stress of 38 ksi, which is less than its yield stress of 73,000 psi. FIG. 4C provides a table describing other possible dimensions for inner support member 95 for various materials including 7075 aluminum, steel, and a composite including carbon fiber/epoxy.

Figure 4D:
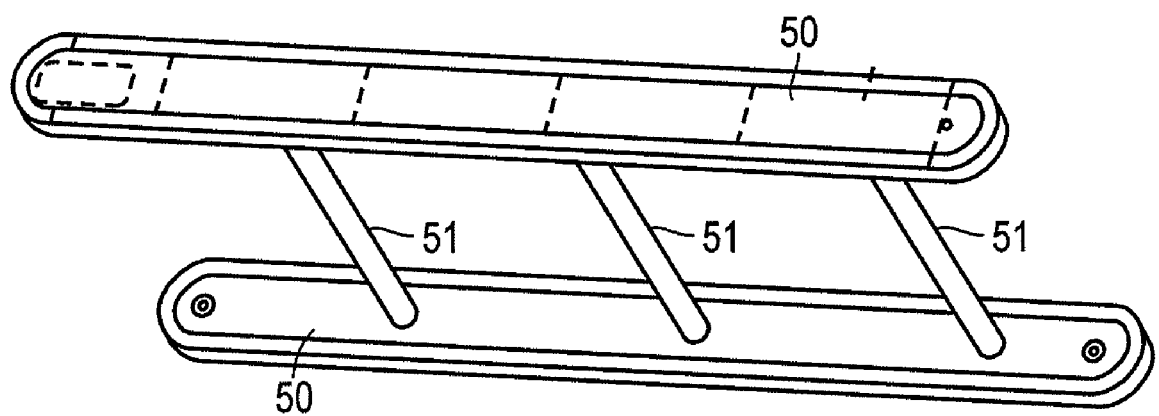
FIG. 4D is a perspective view of an underlying support structure for the device of FIG. 2A.

The launch/recovery device 10 can also include an underlying support structure 51 to further hold together the two spaced rails 50 (see FIG. 4D). These underlying support structures 51 add rigidity to the launch/recovery device 10, without interfering with water flow through the launch/recovery device 10 and without interfering with the deflection of the wet-traction members 55. In certain embodiments, the support structures 51 may be pivotably connected to the side rails 50 to provide a degree of yaw freedom. Examples of suitable underlying support structures are metal bars, such as for example, aluminum bars, or plastic beams.

The plurality of wet-traction members 55 are translated in a launch direction (descending) 70 or a recovery direction (ascending) 75 through means of the cable or belt 65. Belt 65 can be driven by a motor or other drive means such as drive assembly including a toothed wheel (see FIG. 2B) which includes a plurality of spokes 67 that interface with wet-traction members 55 via slider 60 and drive its translation.

Figure 5:
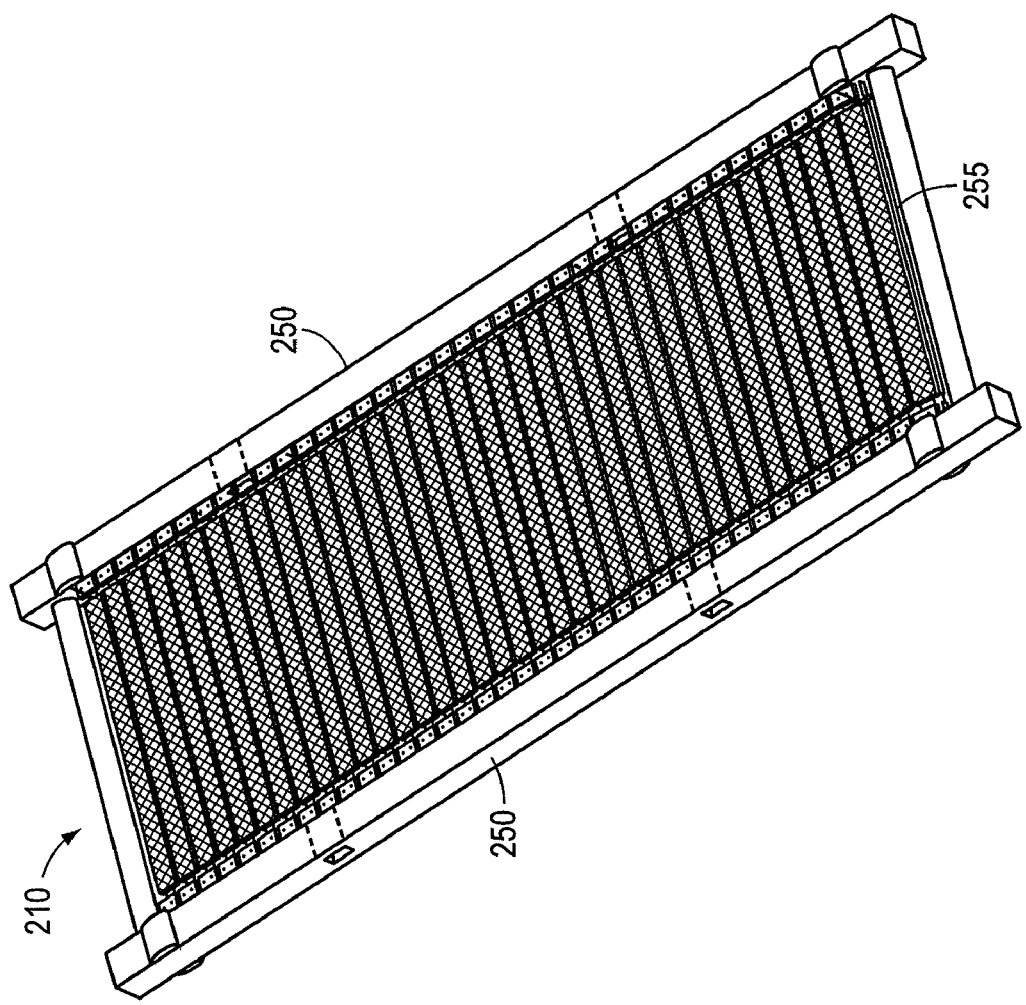
FIG. 5 is a perspective view of another embodiment of a launch/recovery device.
Figure 6:
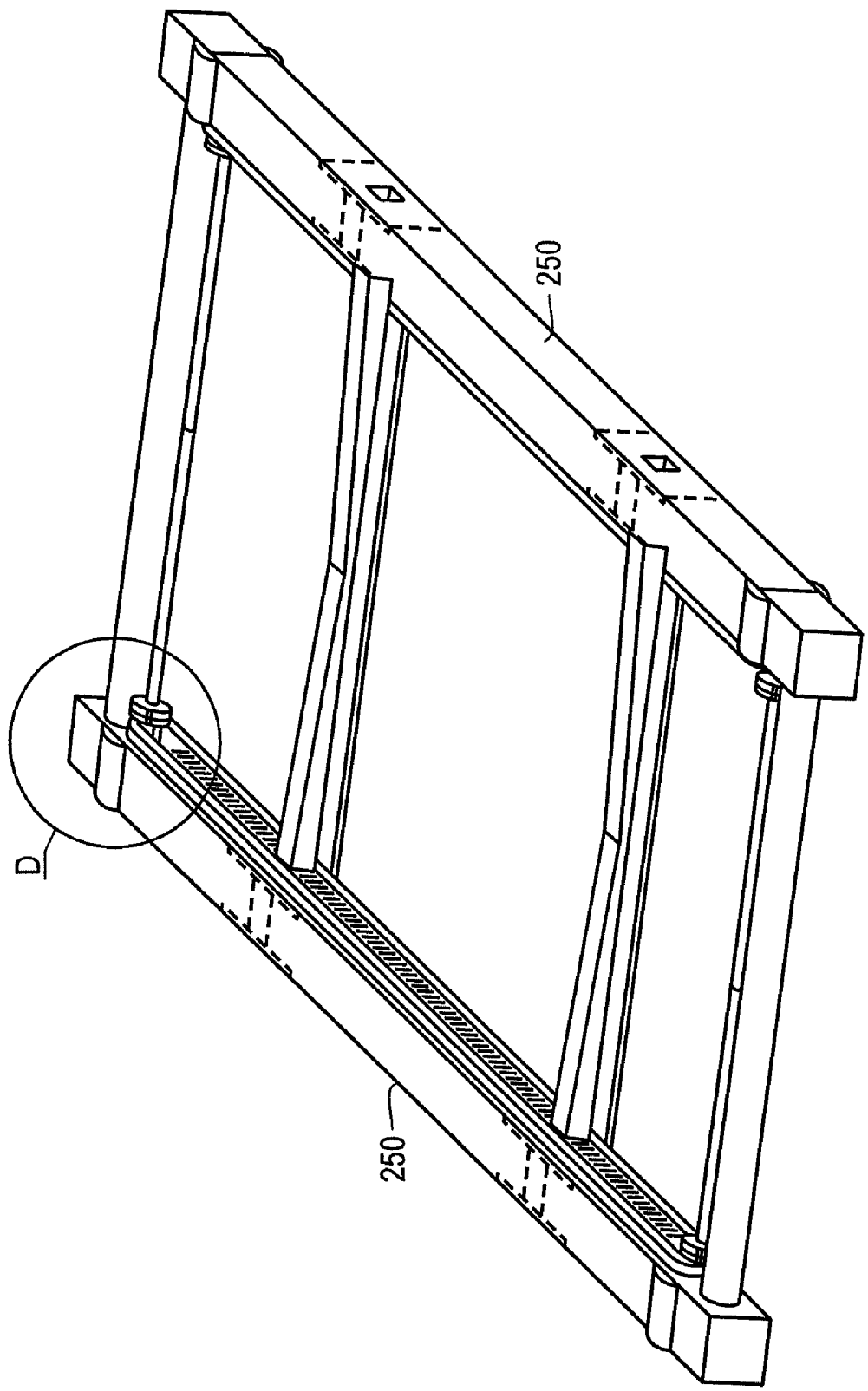
FIG. 6 is a perspective view of the device of FIG. 5 with tension members removed.
Figure 7:
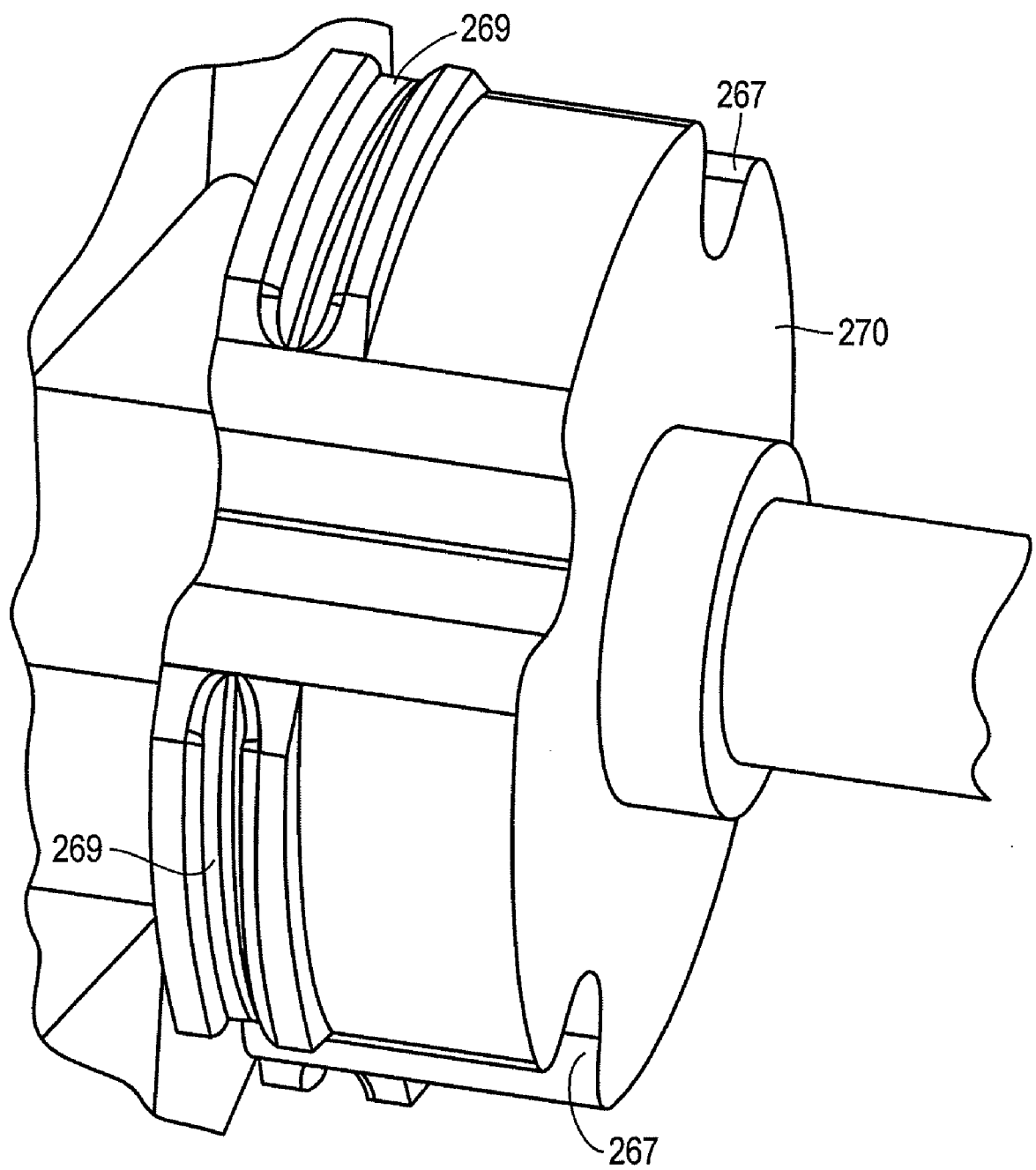
FIG. 7 is an enlarged perspective view of the upper left portion of the device of FIG. 6.
Figure 8A:
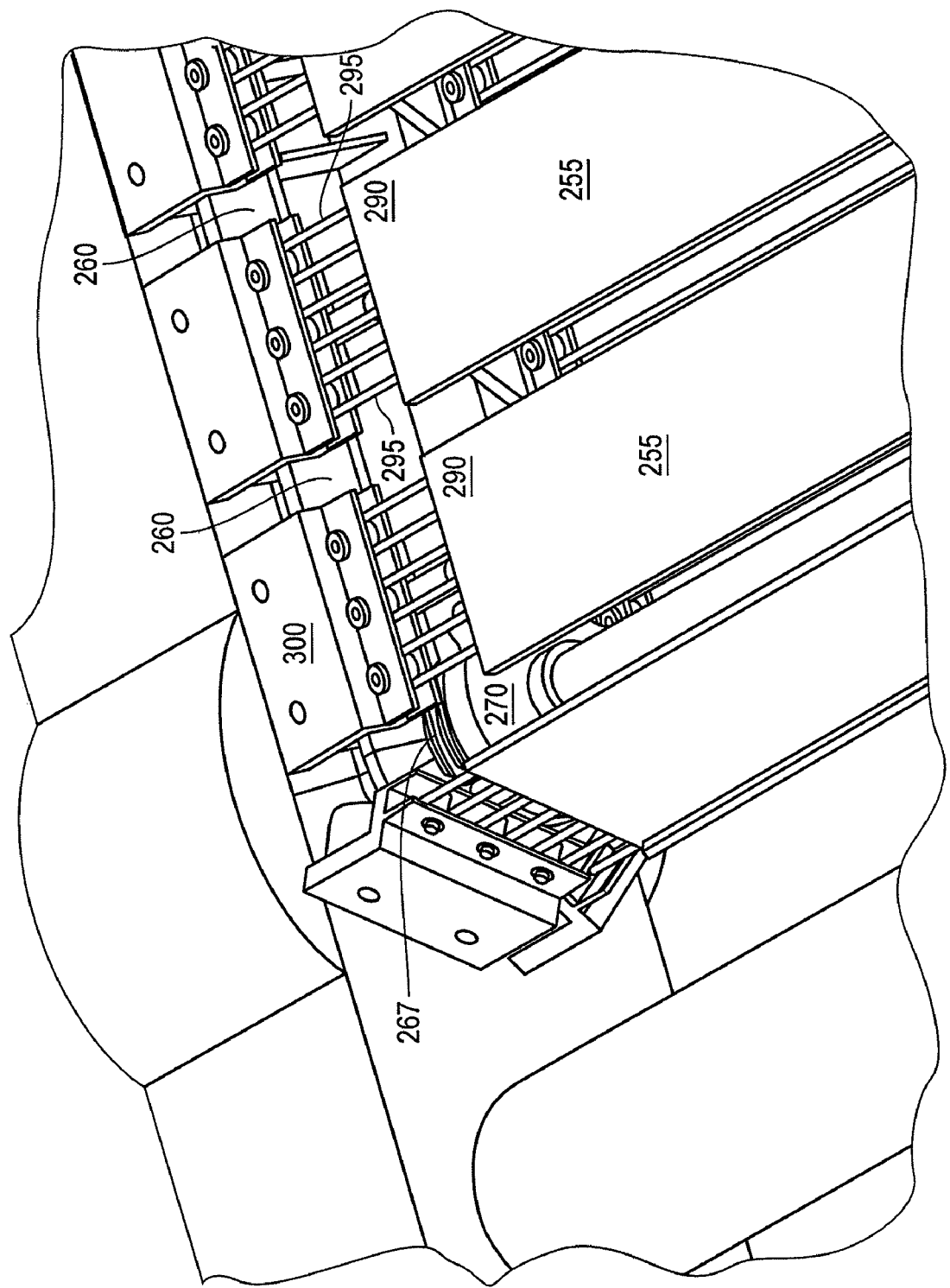
FIG. 8A is an enlarged perspective view of a portion of the launch/recovery device of FIG. 5.
Figure 8B:
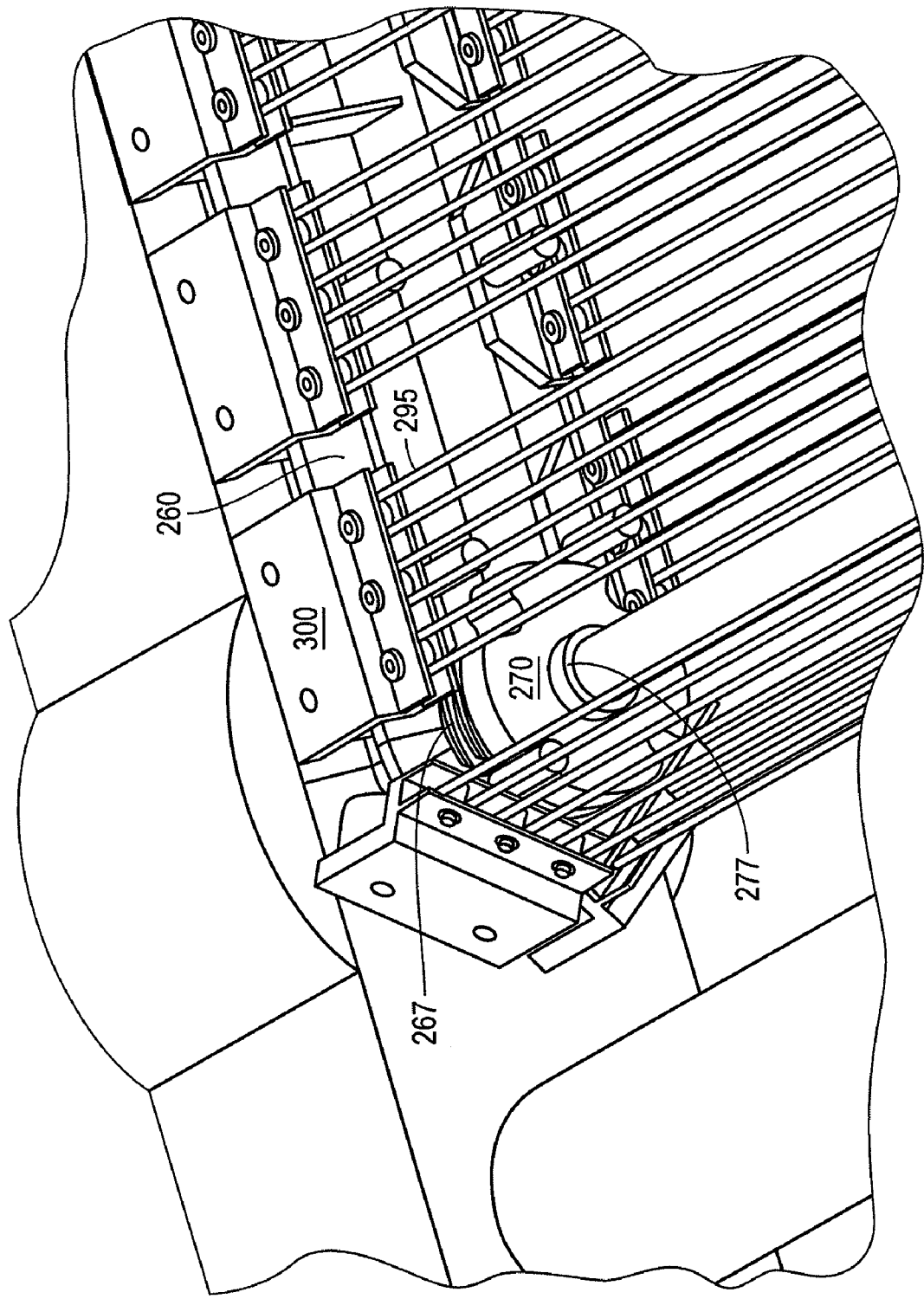
FIG. 8B is an enlarged perspective view of a portion of the launch/recovery device of FIG. 5 with a wet-traction layer removed to show underlying ropes.
Figure 9:
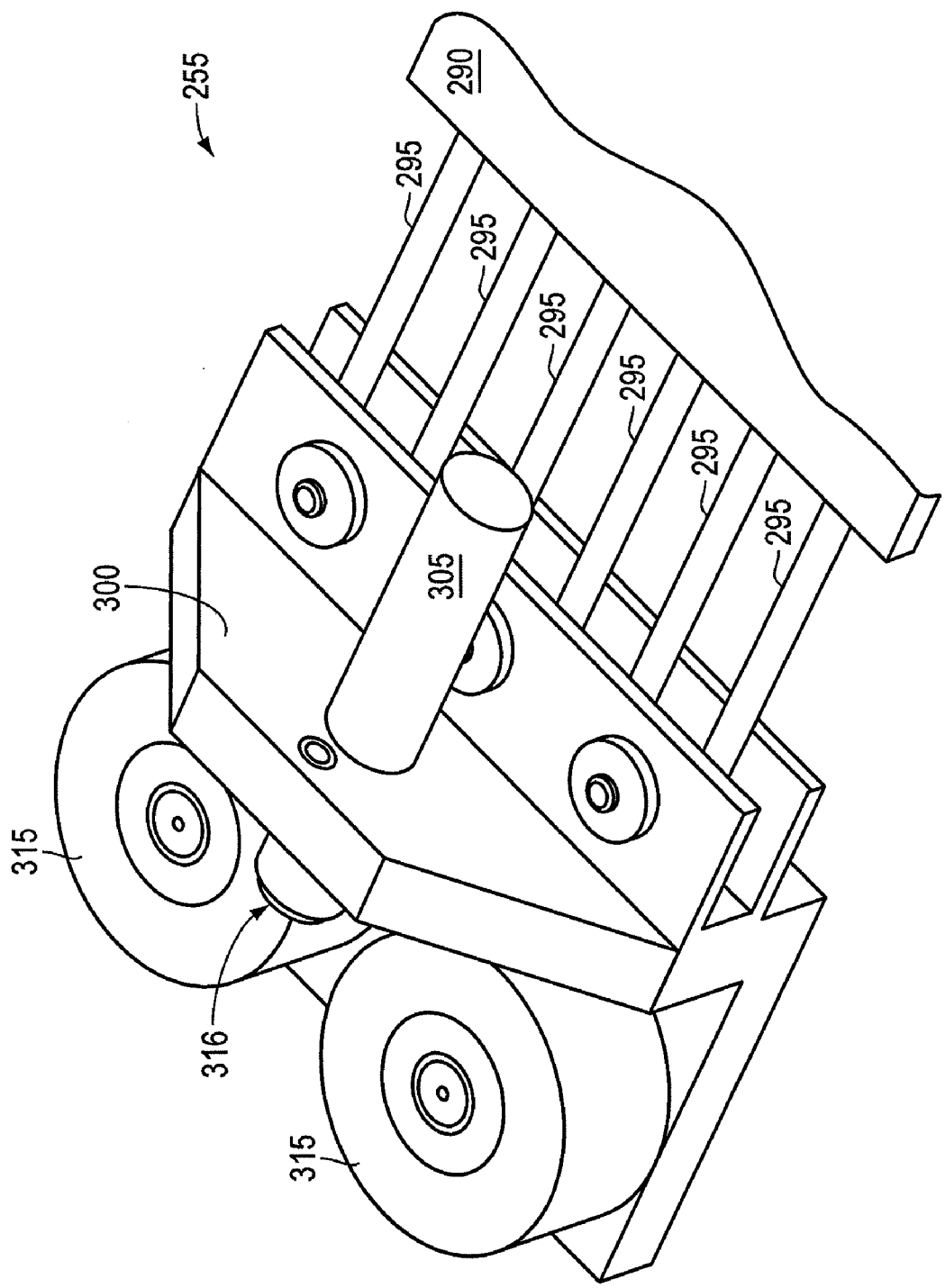
FIG. 9 is an enlarged perspective view of a trolley used to guide the tension members of FIG. 5.

Referring to FIG. 5, there are a number of possible different embodiments of a launch/recovery device in accordance with the invention. For example, FIG. 5 shows a perspective view of another launch/recovery device 210 that includes spaced side rails 250 and a plurality of wet-traction members 255, that provide support by the tension that develops in them when a weight is applied. These members will be referred to as tension members. FIG. 6 shows the side frame rails with the tension members removed. An enlarged view of the upper left portion (D) of the launch/recover device is shown in FIG. 7. FIG. 7 shows a drive wheel 270 with contours 267 that drive the tension members 255 via trolleys 300 shown in FIGS. 8A, 8B, and 9 and guides 269 to retain the cables that connect and move the trolleys 300 along the side rails 250. Referring to FIGS. 8A and 9, the wet-traction members 255 of launch/recovery device 210 include a plurality (e.g., 6) of ropes, cables, or monofilaments 295 positioned in tension between the two spaced rails 250. (While the embodiment in FIGS. 8A and 9 show a plurality of ropes, cables, or monofilaments, in other embodiments it is possible to have a single rope, cable, or wire positioned in tension between the two spaced rails 250.) These ropes 295 are oriented with respect to one another and to the spaced rails 250 such that all of the ropes 295 are perpendicular to a longitudinal axis of the spaced rails. The ropes 295 are formed from a strong but flexible material such as, for example, steel wire, aromatic polyester fibers (e.g., Vectran™ fibers), carbon fibers, steel fibers, glass fibers, or wire rope, such as, for example, high stretch wire rope such as 8×19 fiber core (preferably with individual wires of extremely high tensile strength and corrosion resistance). The ropes 295 are translated in the launch direction 70 or in the recovery direction 75 through the movement of the trolleys 300 pulled by the cable or belt 260, driven by a wheel 270 rotated by gearmotor 277 or by other means (e.g., manually).

The ropes 295 in combination with a wet-traction outer layer 290, together form the wet-traction members 255 as shown in FIG. 9. (In FIG. 8B, the wet-traction outer layer 290 is not shown so that the ropes 295 are visible.) The outer layer 290 is formed of any wet-traction providing material, such as, for example rubber, and in some embodiments, the outer layer 290 is textured (e.g., with protuberances) to provide further wet-traction capabilities.

The ropes 295, which are covered by the outer layer 290 along some portion of their length, provide the launch/recovery device 210 with a non-liner force deflection curve. Without wishing to be bound by theory, it is believed that the non-linear force deflection curve allows for a softer vehicle landing on device 210 with the force deflection curve being between a square law and a cubic law, with very low forces generated at small deflections when compared with the slat member 55 embodiment, which has a linear force deflection curve.

Figure 10:
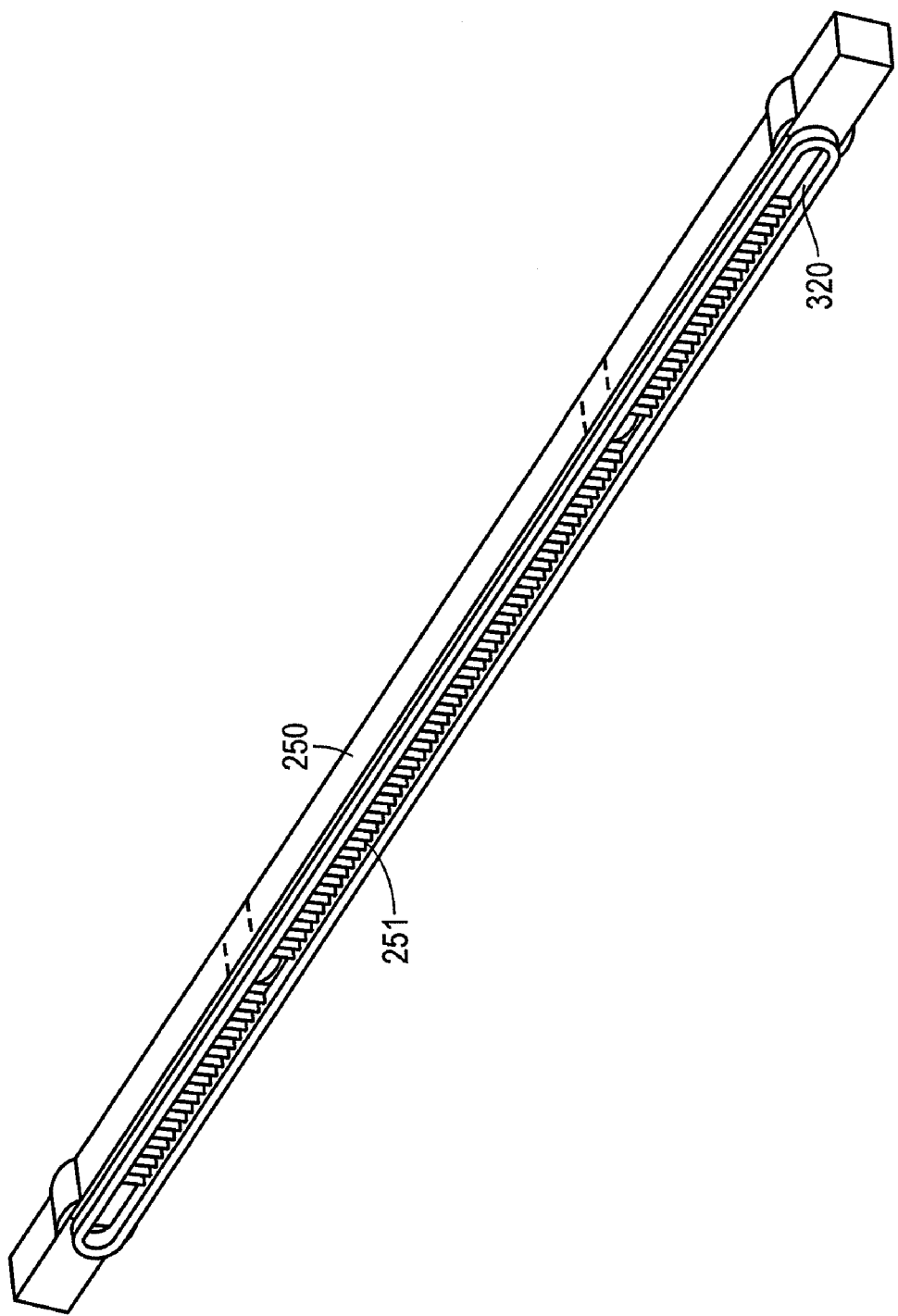
FIG. 10 is a perspective view of a side rail of the device of FIG. 5.
Figure 11:
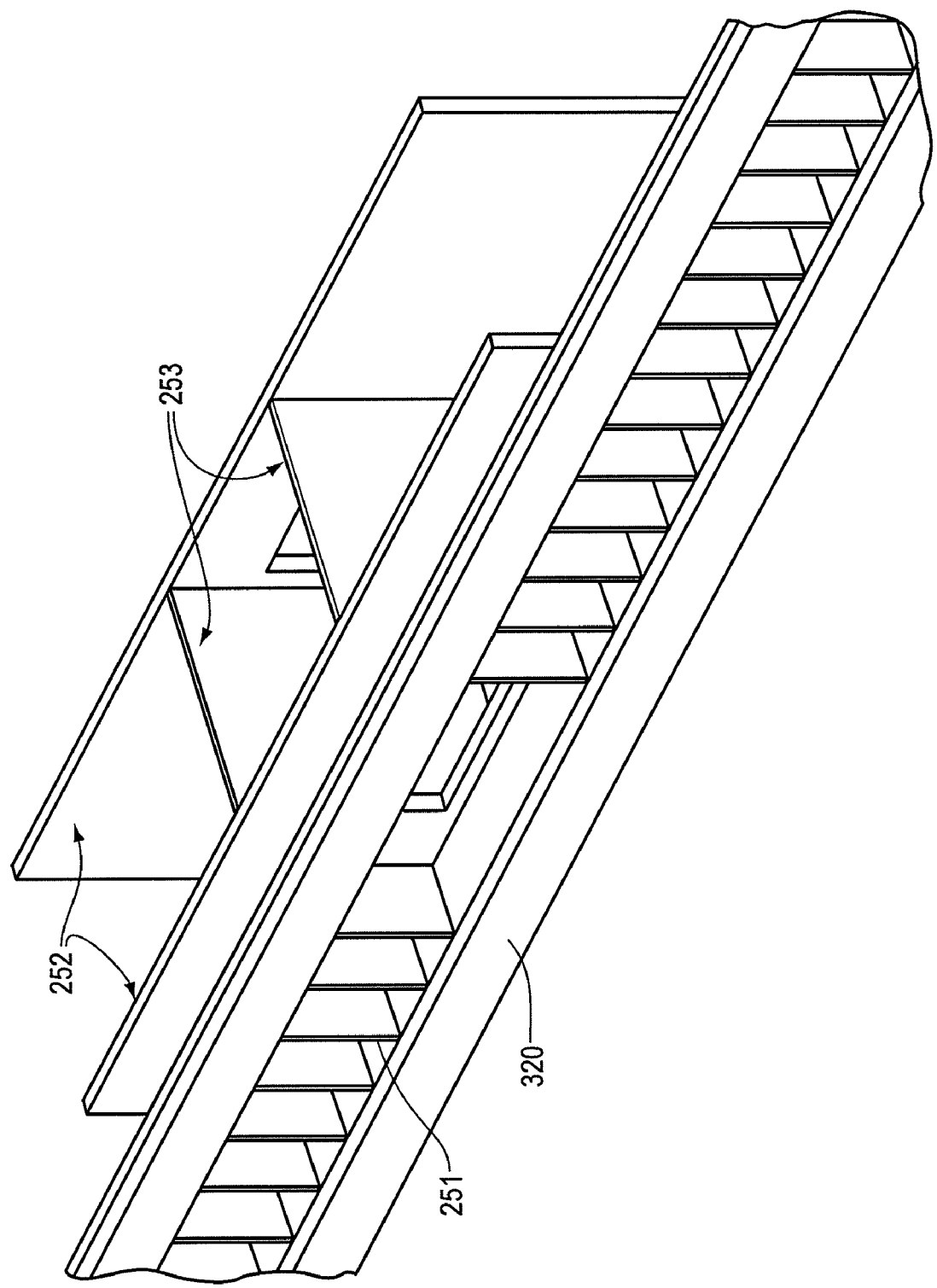
FIG. 11 is an enlarged perspective view of a portion of the side rail of FIG. 10.
Figure 12:
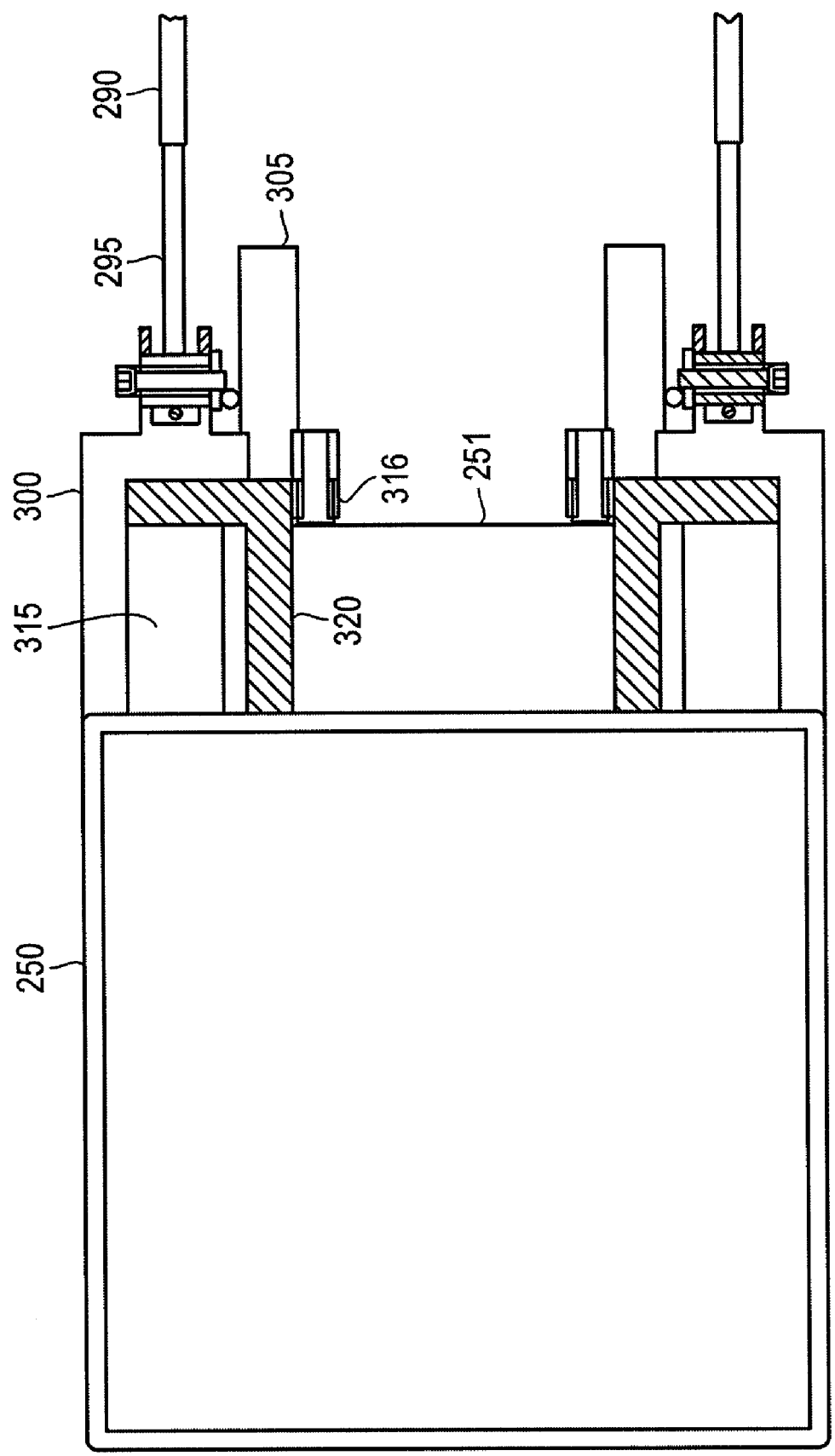
FIG. 12 is a cross sectional view of a portion of the launch/recovery device of FIG. 5.

Belt or cable 260 drives trolleys 300 (see FIG. 9) along the spaced rails 250 in a forward direction or in a reverse direction. Drive pins 305 on the trolleys 300 engage in the drive wheels 270 (see FIG. 7) at the pin contours 267, to keep both sides operating at the same speed. The trolleys 300 include rollers 315 and 316 that guide the trolleys 300 on an "L" rail track 320 (see FIGS. 10, 11, and 12) within the side rails 250. As a result, the trolleys 300 carry the tensioned ropes 295 that form at least a portion of the wet-traction members 255 in a controlled and guided fashion around the spaced rails to provide translation of the wet-traction members 255 in both the launch direction 70 and the recovery direction 75. FIGS. 10 and 11 show a view of the right side rail showing the "L" rail and reinforcing members 251 to keep the "L" rails from deflecting under the high loads caused by the tension members 255. FIG. 11 further shows internal reinforcing members 252 and 253 that minimize local stresses where the underlying support structure 51 (see FIG. 4D) attaches through the side rail 250. FIG. 12 shows a cross sectional view through the side rail 250, the "L" rail 320, the trolley 300, its drive pin 305, its small guide/retention roller 316 and its supporting shaft, the tension member ropes 295 and the traction member material 290. One of the two wheels 315 used to take the tension loads is shown in side views as is one of the nominally 6 tension member ropes 295.

Figure 13:
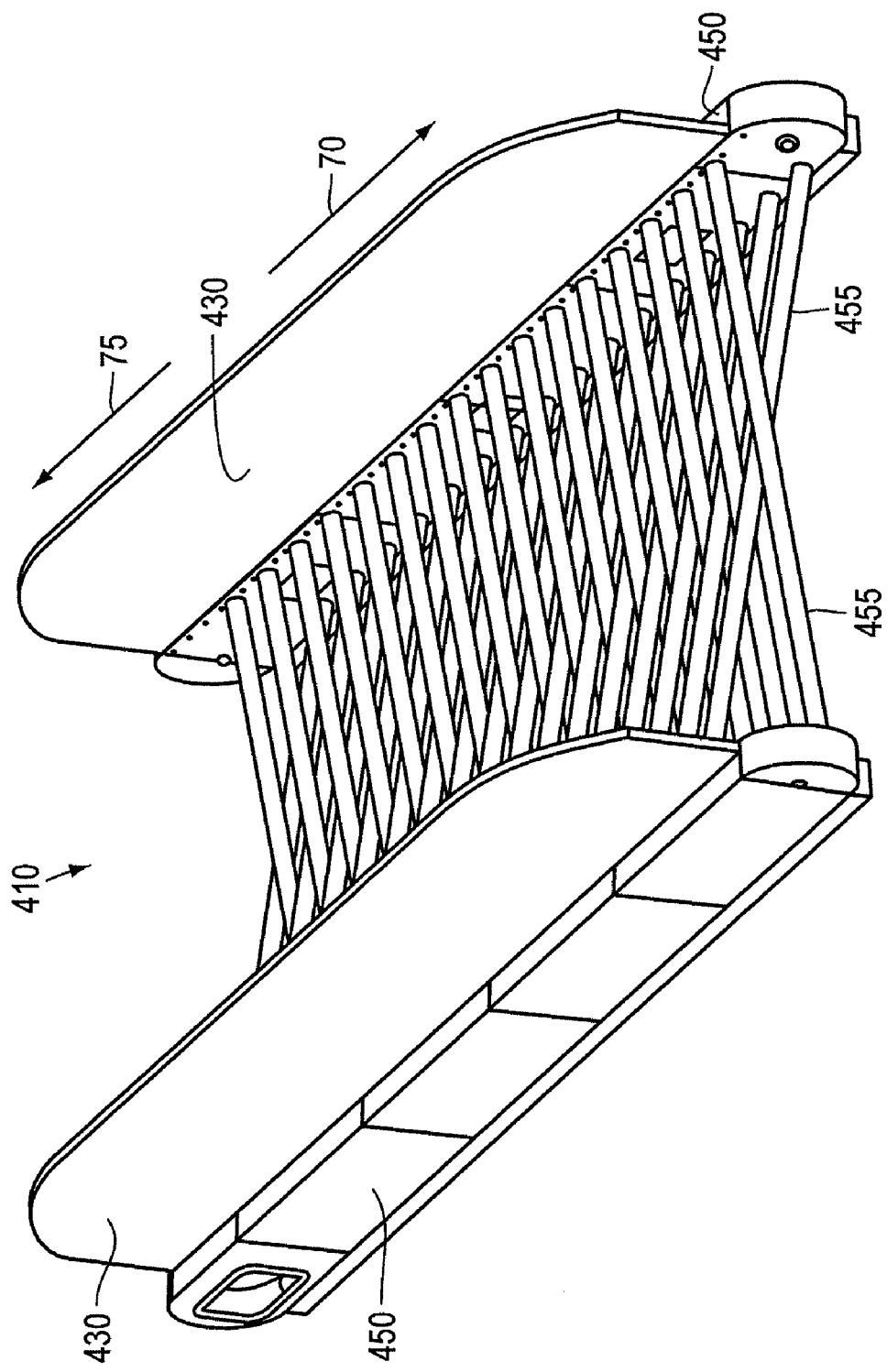
FIG. 13 is a perspective view of another embodiment of a launch/recovery device.

FIG. 13 illustrates another possible launch/recovery device 410. This launch/recovery device 410 includes a pair of spaced rails 450 and a plurality of wet-traction members 455 arranged to form a v-shape near a center portion of the launch/recovery device 410. (Alternatively, the wet-traction members 455 can be positioned horizontally to create a flat bed shape rather than the v-shape.) In the embodiment shown in FIG. 13, the plurality of wet-traction members 455 provide translation of a water craft in the launch direction 70 or in the recovery direction 75 by rotation. That is, each of the wet-traction members 455 rotates in place in a forward direction 470 or a reverse direction 475 (see FIG. 14) as controlled and driven by motors 460 (see FIG. 15) positioned within the spaced rails 450. The motors 460 not only control the direction of rotation but also control the speed of rotation and can be further provided with a brake to aid in slowing the rotation of the wet-traction members 455. In certain embodiments, the motors 460 are positioned in both left-side and right-side spaced rails. The motors 460 in the left-side spaced rail control the direction and speed of rotation of the wet-traction members 455 that have a lower end connected to the left-side spaced rail. Similarly, motors 460 in the right-spaced rail (not shown in FIG. 15) control the direction and speed of rotation of the wet-traction members 455 that have a lower end connected to the right spaced rail. However, other configurations of the motors 460 and wet-traction members 455 are possible.

Figure 14:
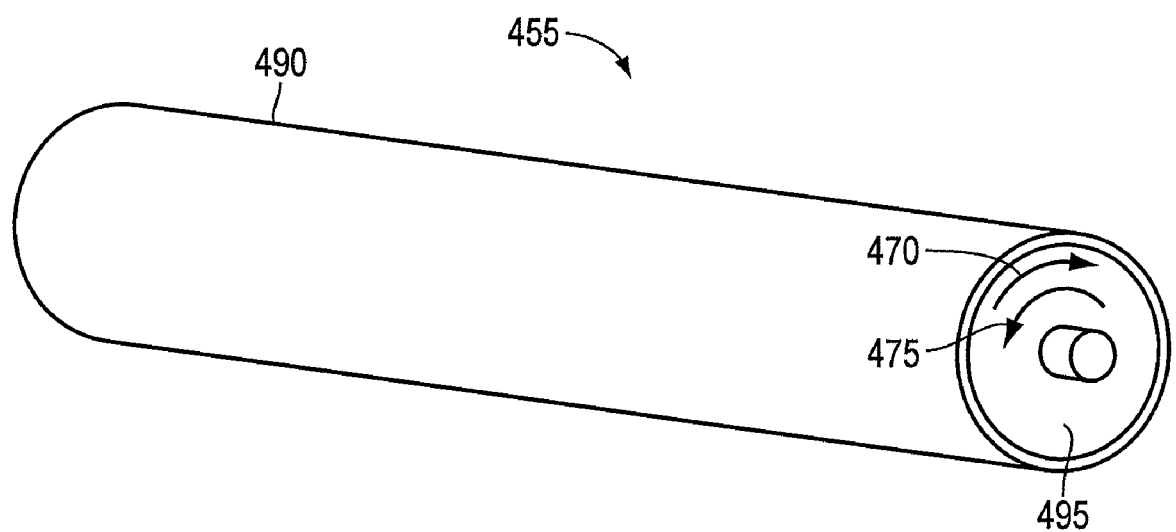
FIG. 14 is an enlarged perspective view of a single wet-traction member.
Figure 15:
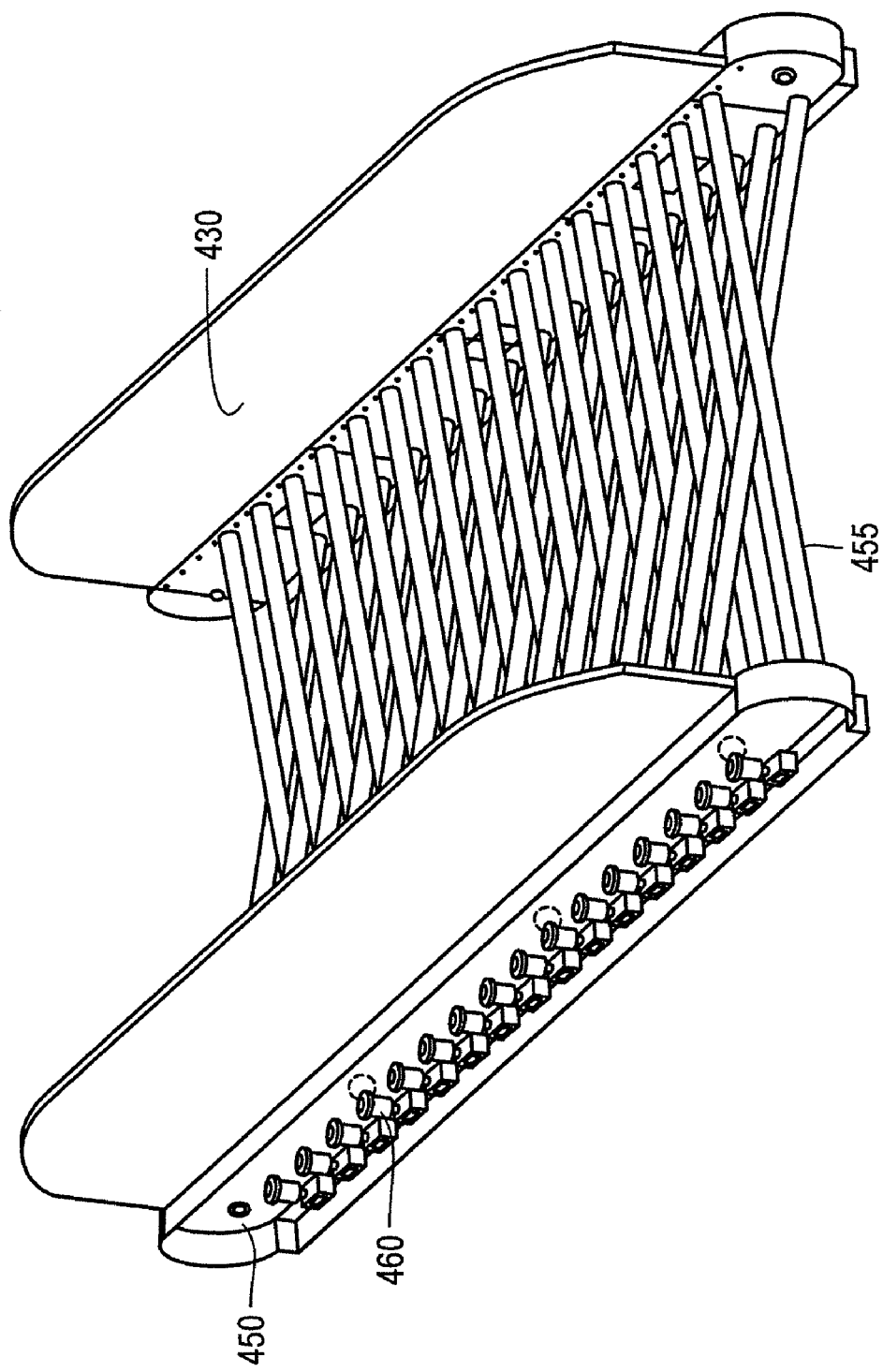
FIG. 15 is a perspective side view of the device of FIG. 13 with a portion of a left side rail removed.

Each of the wet-traction members in this embodiment can be formed of an inner support bar 495 coated with a wet-traction providing material (e.g., rubber) layer 490, as shown in FIG. 14. In some embodiments, the inner support bar 495 is solid through its diameter. In other embodiments, the inner support bar 495 is hollow. The diameter of the inner support bar 495 is selected to provide strength to hold the water vehicle 20 or 25 and at the same time provide flexibility so that the wet-traction members 455 can deflect to achieve a soft interaction between the water vehicle 20 or 25 and the launch/recovery device 410. In certain embodiments, the wet-traction members 455 are designed and sized such that two rollers can support a 22,000 lbs weight. FIG. 16 provides a chart of examples of some possible dimensions for inner support bar 495 (e.g., inner and outer diameter of the inner support bar 495) for various materials including 7075 aluminum and a composite including carbon fiber epoxy.

Launch/recovery device 410, as well as other launch/recovery devices in accordance with the invention such as 10 and 210, can further include a pair of side retainers 430 that extend from the side rails 450 (or from side rails 50, or side rails 250). The side retainers 430 prevent the water vehicle 20 or 25 from traversing over the rails 450 during a launch or recovery procedure. The side retainers 430 are adjustable. That is, in certain embodiments, the side retainers 430 can be adjusted in an upright, working position as shown in FIG. 13 and then further adjusted to a collapsed, storage position after use. The side retainers 430 can be formed of a rigid plastic sheet or metal sheet. Alternatively, the side retainers 430 can be formed of a screen, mesh, or netting material combined with a stiff perimeter frame.

Figure 17A:
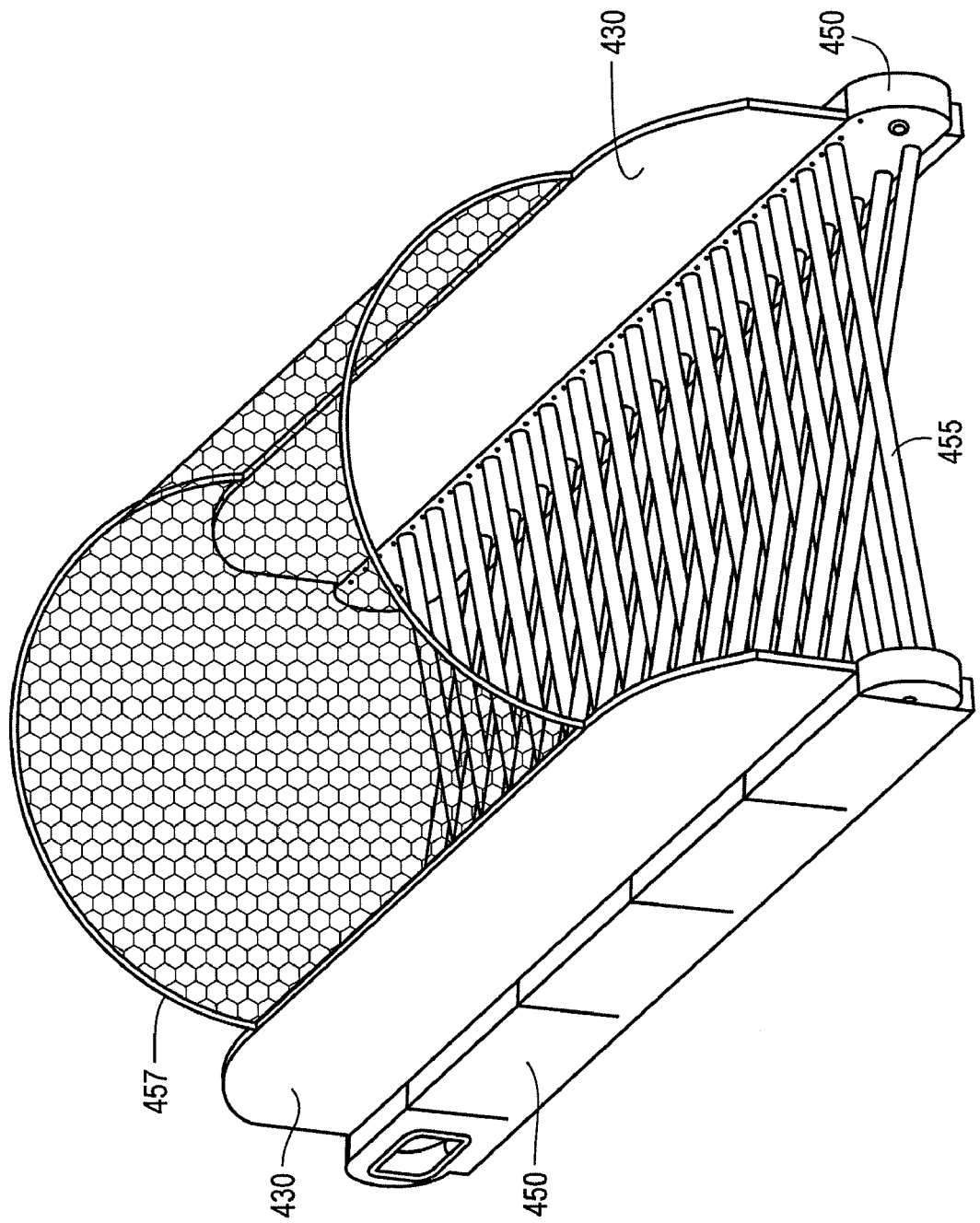
FIG. 17A is a perspective view of a launch/recovery device including a netting extending between two side rails.

In certain embodiments, a screen, mesh, or netting material 457 can extend from one of the two spaced side rails 450 to the other spaced side rails 450 or from side retainer 430 to side retainer 430 (see FIG. 17A) to provide additional unmanned underwater vehicle (UUV) capture capabilities. This netting 457 would be formed preferably from a buoyant material allowing the netting to float on the water surface. This way a UUV could approach the ramp and be under the netting. In other embodiments, the netting can extend out of the water and be supported by a central framing system, which can collapse to a folded position when not in use and located within the side retainers 450. In this out-of-water embodiment, an unmanned surface vehicle (USV) might pass under the netting during a launch or a recovery.

Figure 17B:
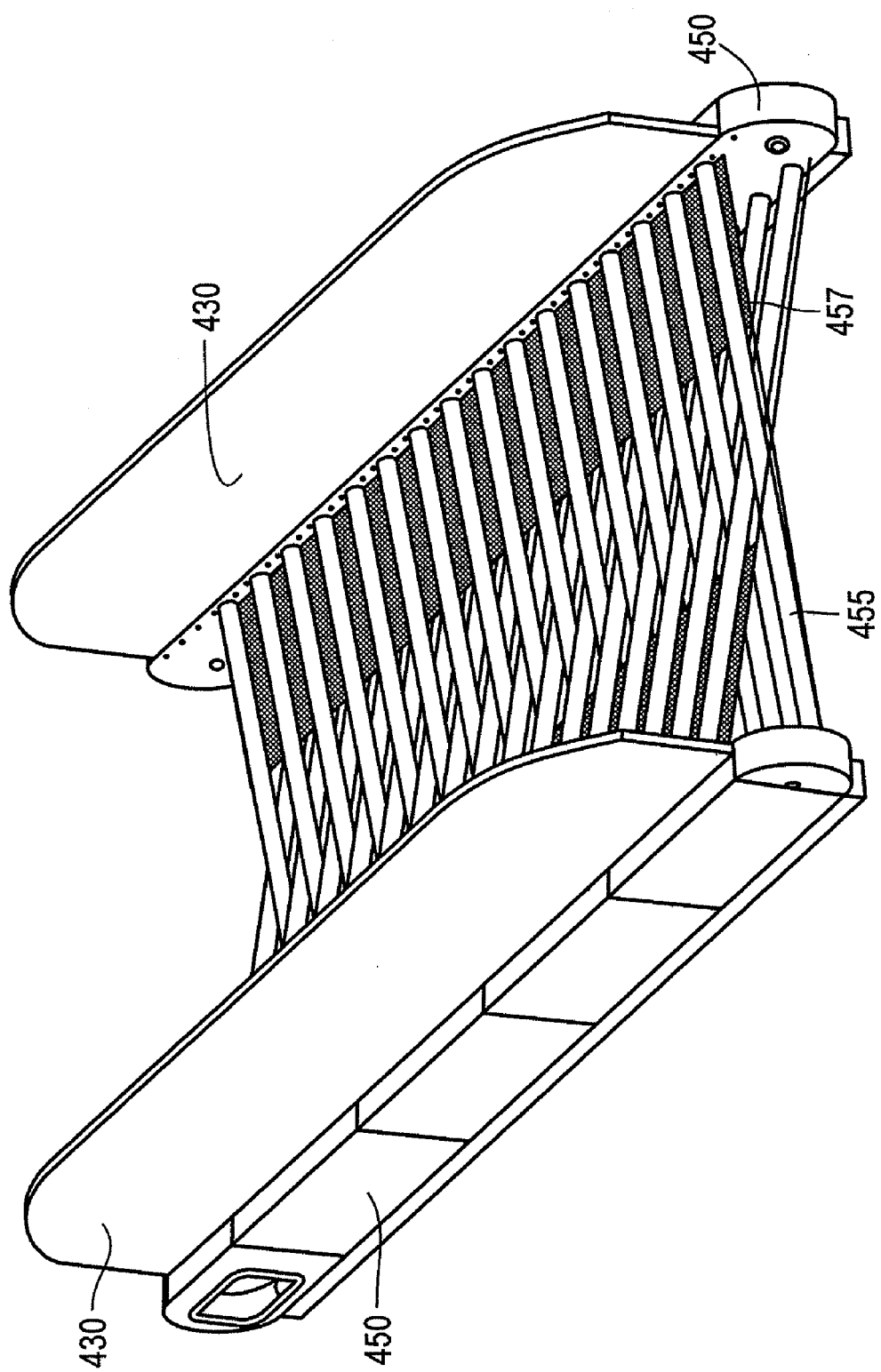
FIG. 17B is a perspective view of a launch/recovery device including a netting disposed between wet-traction members.
Figure 18A:
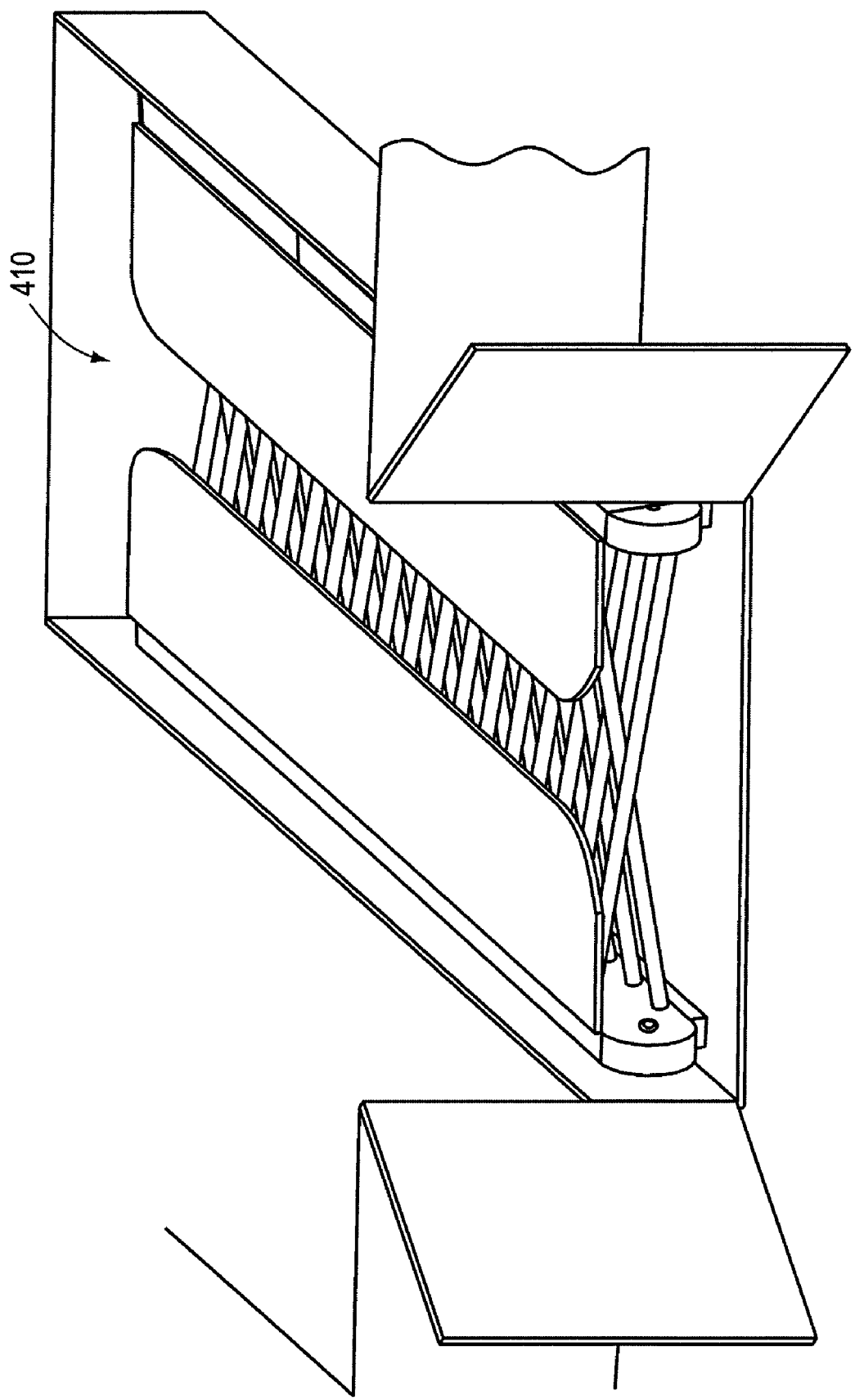
FIGS. 18A-18D illustrate a method of recovery of a water vehicle.
Figure 18B:
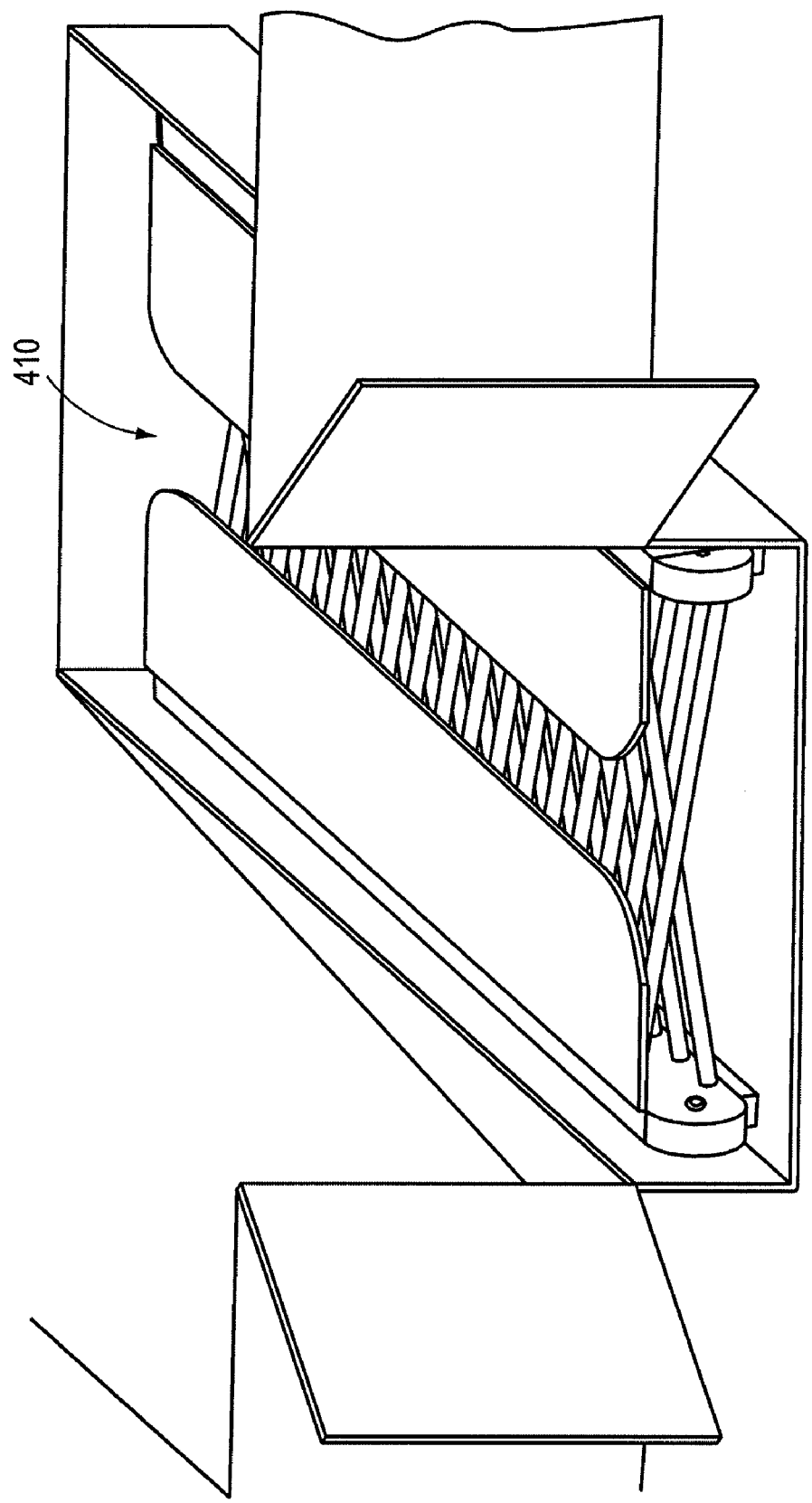
Figure 18C:
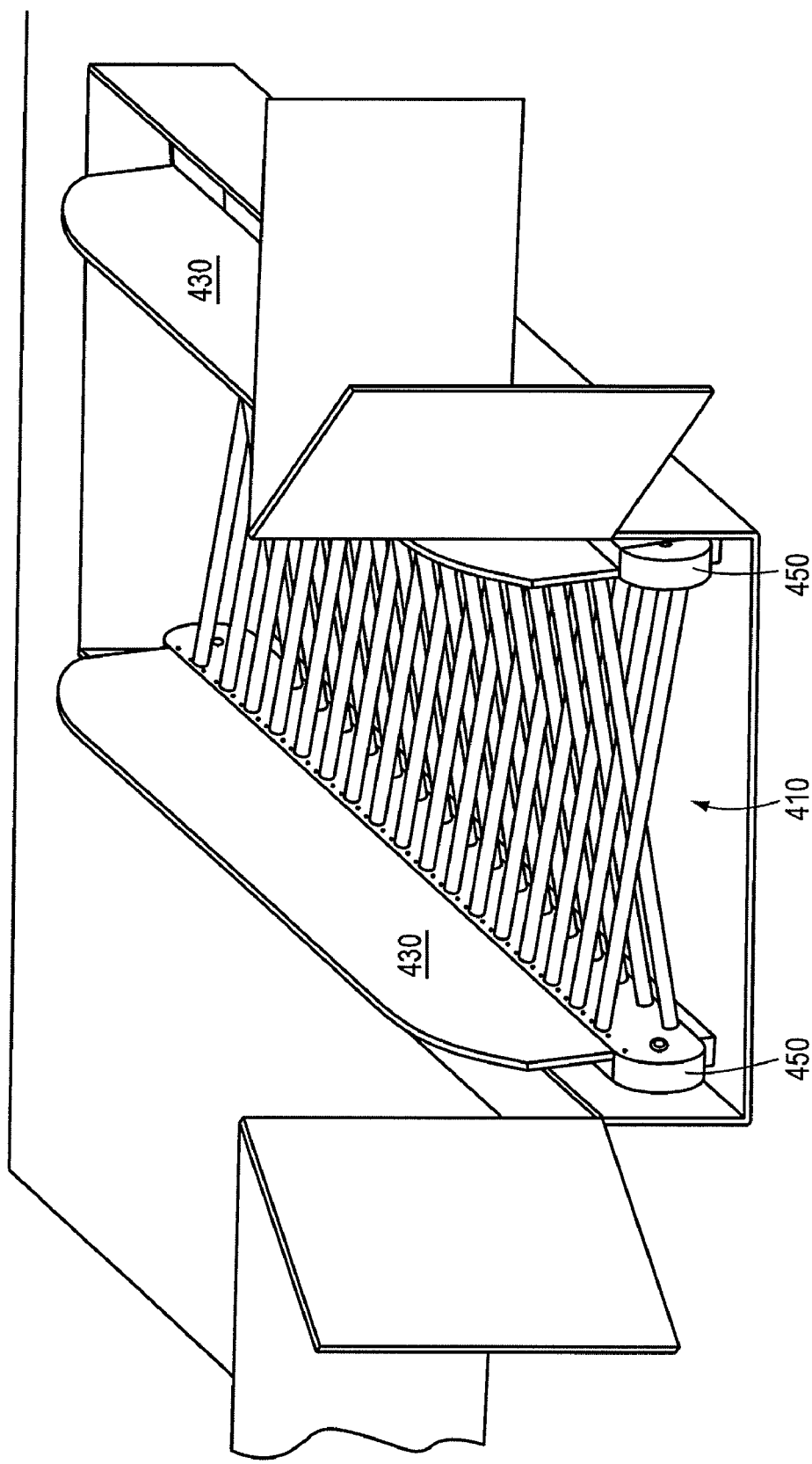
Figure 18D:
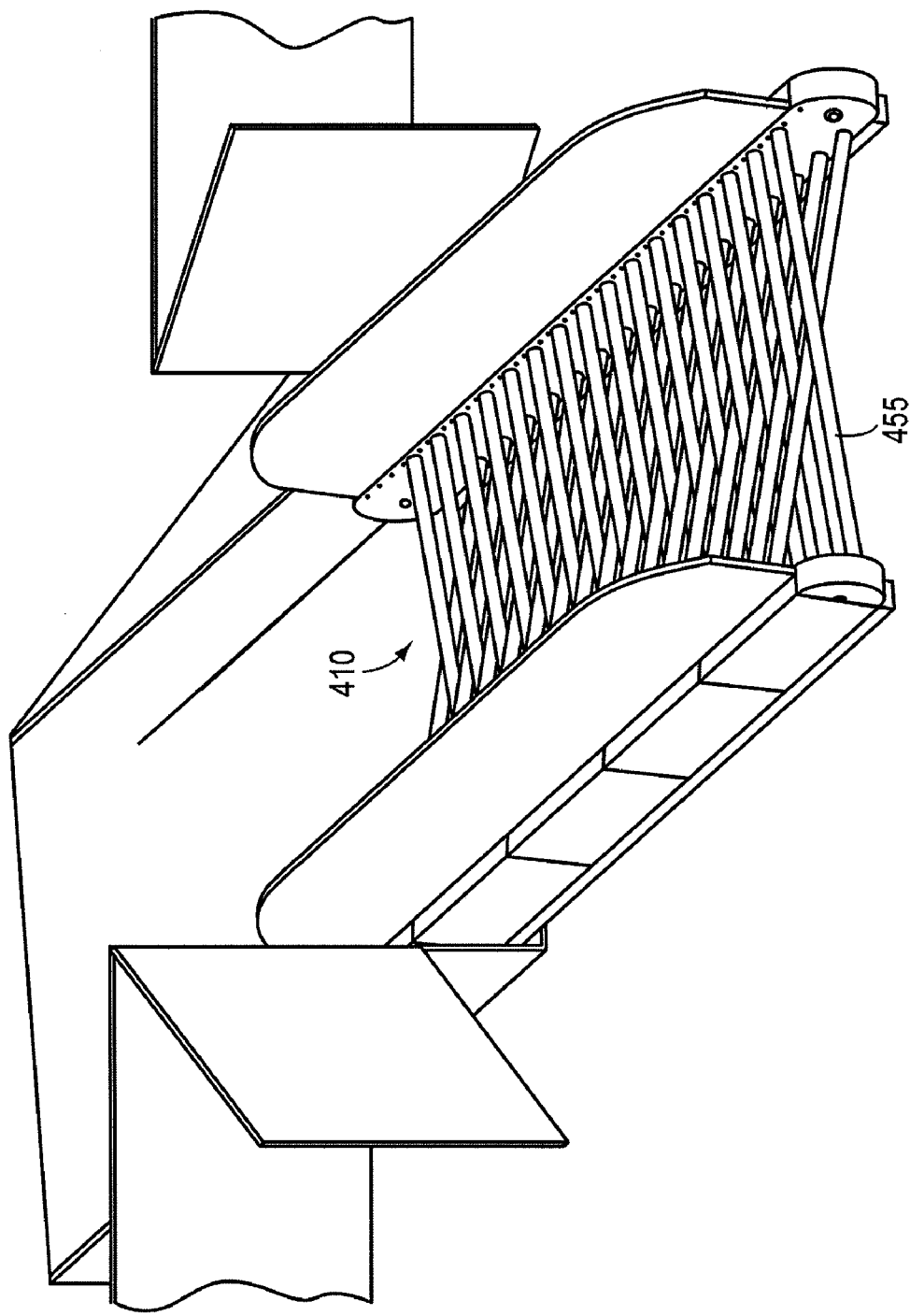

In other embodiments, netting 457 can extend between the wet-traction members on each side of a central portion of the device 410 to prevent a vessel or person from passing down between the rollers 455. (See FIG. 17B)

As described above, launch/recovery devices 10, 210, and 410 can be used to launch and recover water vehicles. One method for recovering a water vehicle is illustrated in FIG. 18A-D. Specifically, a vessel including the launch/recovery device 410 upon commencing a recovery process, can open doors positioned on its hull/transom to expose the launch/recovery device 410. (See FIG. 18A). Next the launch/recovery device 410 is automatically tilted downward to a preselected angle of recovery between about 0 and 50 degrees (e.g., between about 5 and 40 degrees). (See FIG. 18B). For example, for surface water vehicles the angle of approach (about 5 to 25 degrees) to the vessel will differ from an underwater vehicle (about 10 to 35 degrees). As a result, an operator of the launch/recovery device 410 can enter an angle of tilt into a control unit (e.g., a computer) or alternatively can select the angle from a database stored on the control unit or choose an angle appropriate to the sea conditions. Upon receiving the angle information the control unit automatically tilts the launch/recovery device 410 to the appropriate angle. (Alternatively, the operator can manually control the tilt of the launch/recovery device 410). In certain embodiments, when so equipped, the side retainers 430 are raised or positioned in their upright state to prevent an approaching water vehicle from passing outward or outboard over the side rails 450. (See FIG. 18C). Once the launch/recovery device 410 is properly positioned, the device is extended into the water and the motors 460 are actuated to rotate the wet-traction members 455 at a speed entered into the control unit. (See FIG. 18D). In certain embodiments, the speed of the wet-traction members 455 is set initially to a nominal speed (e.g., 20 to 100 rpm). In other embodiments, the speed is pre-set to a low value such as 45 to 60 rpm. The operator may be provided with an additional means of controlling the speed of rotation (e.g., a foot pedal or hand brake) and can further fine tune the speed of rotation based upon the particular recovery procedure. The device 410 can further include an overriding clutch to allow the rotation of the members 455 to rotate more quickly if the water vehicle being captured is moving more quickly than the rotation of the top surface of members 455 provides.

Once positioned on the launch/recovery device 410 the wet-traction members 455 are rotated to provide translation of the water vehicle in the recovery direction 75. No tow line is used or required to pull the water vehicle up the launch/recovery device 410 and into the host vessel. Rather, the rotation of the wet-traction members 455 provides the motion and force to move the water vehicle up the device 410. As a result, operator safety and the speed of recovery is increased.

In certain embodiments, especially those which involve unmanned underwater vehicles, the launch/recovery device 410 can be provided with a homing signal or other positioning device so that the water vehicle can be automatically guided towards the launch/recovery device 10, 210, or 410.

A launching procedure is very similar to a recovery procedure. However the direction of rotation or translation of the wet-traction members 55, 255, or 455 is reversed so that the speed of the water vehicle can be controlled as it leaves the vessel and travels down the device 10, 210, or 410 towards the water.

Figure 19A:
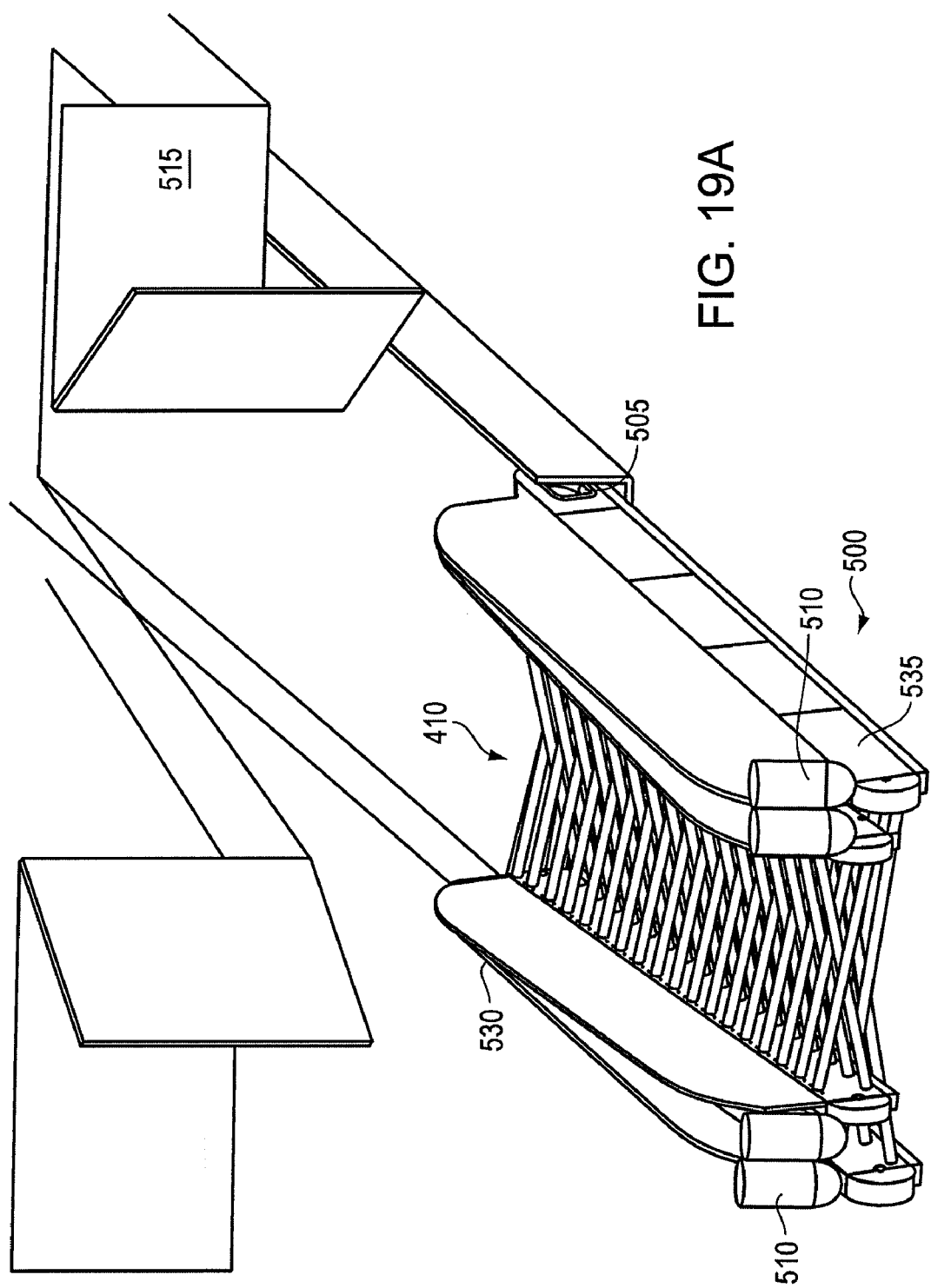
FIG. 19A is a perspective view of a launch/recovery device including an assembly that accommodates pitch and yaw degrees of freedom.
Figure 19B:
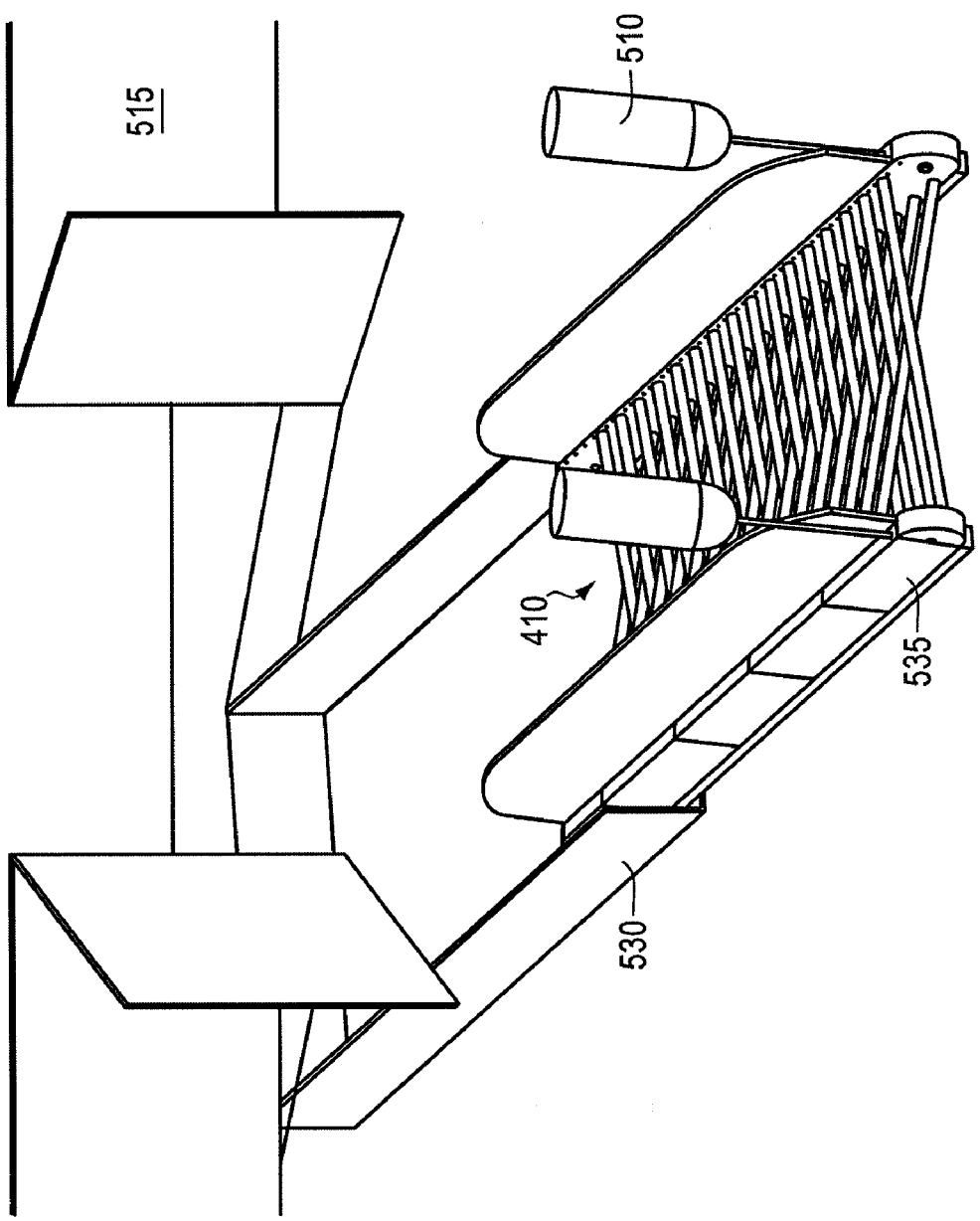
FIG. 19B is perspective view of a launch/recovery device including an assembly that accommodates pitch and yaw degrees of freedom.
Figure 20A:
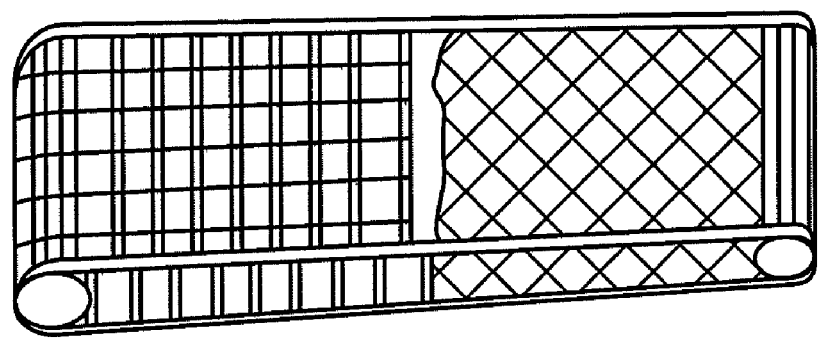
FIGS. 20A-20D show a launch/recovery device that includes basic mesh or netting, which is stretched along the length of the device on each side.
Figure 20B:
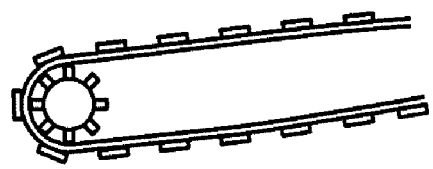
Figure 20C:
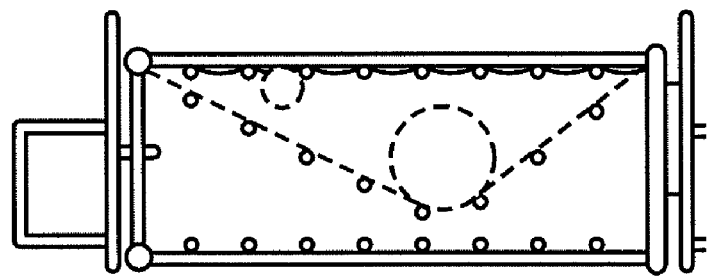
Figure 20D:
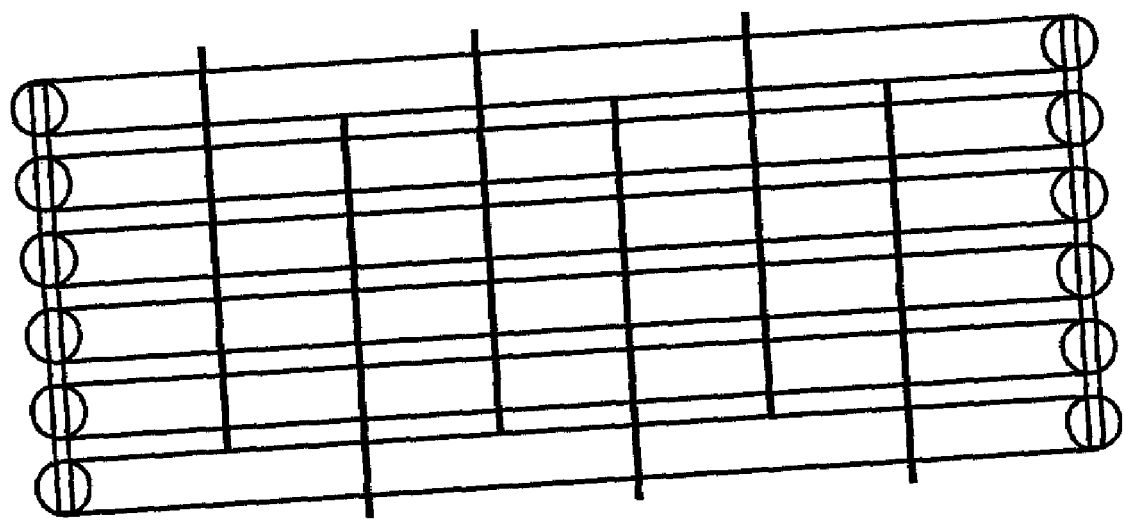

Referring to FIGS. 19A and 19B, some embodiments of the launch/recovery devices 10, 210, and 410 can also include an assembly to add pitch and yaw degrees of freedom. As waves pass underneath the vessel with connected launch/recovery device 10, 210, or 410, the height of each of the vessel and launch/recovery device as well as their respective positions may be affected to a different degree by the waves. As a result, the angles and relative positions of the vessel and device may become askew for a period of time. To minimize differences in position and height, the launch/recovery device may include assembly 500. Assembly 500 includes a pivotable connector 505 located on a forward portion 530 of the launch/recovery device 10, 210, or 410 and two or more floatation devices 510 positioned on an aft portion 535 of the device 10, 210, or 410. The pivotable connector 505 connects the stem of vessel 515 with launch/recovery device 410 and provides pitch and yaw degrees of freedom. Specifically, the pivotable connector 505 allows for the connection between the device 410 and the vessel 515, even if a wave affects the positions of the device 410 and vessel 515 to a different degree. The floatation devices 510 (which in some embodiments may be replaced with or can further include as shown in FIG. 1 tension lines extending between the vessel 515 and the aft portion of the device 410) provide a pitch degree of freedom between the vessel 515 and the device 410 such that height differences due to interactions between waves and the ramp (or waves and the vessel 515) may be accommodated.

While the invention has been particularly shown and described with reference to specific embodiments, it should be understood by those skilled in the art that various changes in form and detail may be made therein without departing from the spirit and scope of the invention as defined by the following claims. For example, while embodiments above have described the launch/recovery device as being connected to the stem of the ship for the launch or recovery of an active water vehicle, the invention is also applicable to the recovery of dead (non-active) water vehicles. In the recovery of a non-active water vehicle it may be desired to locate the launch/recovery device 10, 210, or 410 on the front of a vessel such as a catamaran or along side a vessel. One advantage to placing the launch/recovery device 10, 210 or 410 on the front of the vessel instead of the stern of the vessel in the case of capturing a non-active water vehicle is ease of maneuverability. For example, when a water vehicle is non-active, it may be best to place the device 10, 210, or 410 on the front of the vessel so that an operator can steer and position the vessel with respect to the non-active water vehicle in a forward direction instead of having to align and capture the water vehicle with the host vessel in reverse. Another example of a possible embodiment relates to the shape of the members extending between the side rails. For example, embodiment 10 includes v-shaped bars 55, embodiment 210 includes a plurality of covered ropes 255, and embodiment 410 includes coated cylindrical bars 455. In other embodiments, not shown, the members can include a triangular or pyramidal shaped coating or portions. In one embodiment, the members can include steep sides that point toward the center region of a ramp to provide a centering and/or retaining function for a launched or recovered water vehicle. A further example of a possible embodiment is shown in FIGS. 20A, 20B, 20C, and 20D in which a basic mesh or netting is stretched between an upper and lower roller with possible side restraints.

Moreover, any feature included in any one of devices 10, 210, or 410 can also be included in the other device embodiments (10, 210, or 410). For example, while only embodiment 210 was described as being manually operated, embodiments 10 and 410, and any other embodiment of the invention can be manually operated. In addition, while only embodiment 410 was described as including a homing or positioning device, embodiments 10 and 210, as well as any other embodiment of the technology can include a positioning device. Other variations are also possible.

What is claimed:

1. A water vehicle launch and recovery device comprising:
   a pair of spaced side rails;
   a plurality of wet-traction members extending at least a portion of the distance between the pair of spaced side rails and arranged to provide a plurality of apertures that allow water to pass through the device, the plurality of apertures comprising about 10% to about 80% of surface area in a plane defined between the pair of side rails; and
   a device to drive at least one of translation and rotation of the plurality of wet-traction members,
   wherein the plurality of wet-traction members comprise an inner support member and an elastomeric covering on an exterior surface of the inner support member.

2. The device of claim 1, wherein the plurality of wet-traction members are formed of a material having a surface roughness of at least about 0.05".

3. The device of claim 1, wherein the elastomeric covering comprises nitrile based rubber.

4. The device of claim 1, wherein the elastomeric covering is textured to provide protuberances.

5. The device of claim 1, wherein the inner support member is formed of metal.

6. The device of claim 1, wherein the inner support member is formed of a composite material.

7. The device of claim 6, wherein the composite material includes at least one of glass fibers, polymer fibers, carbon fibers, and carbon nanotubes.

8. The device of claim 7, wherein the composite material further includes at least one of epoxy, vinylester, and polyester resins.

9. The device of claim 1, wherein the inner support member comprises one or more ropes, or cables.

10. The device of claim 9, wherein the one or more ropes or cables include a plurality of fibers selected from the group consisting of aromatic polyester fibers, carbon fibers, steel fibers, and glass fibers.

11. The device of claim 1, wherein the plurality of wet-traction members are further arranged to form a v-shape between the pair of spaced side rails.

12. The device of claim 1, further comprising a removable floating net attached to the pair of spaced side rails.

13. A water vehicle launch and recovery device comprising:
   a pair of spaced side rails;
   a plurality of wet-traction members extending at least a portion of the distance between the pair of spaced side rails and arranged to provide a plurality of apertures that allow water to pass through the device, the plurality of apertures comprising about 10% to about 80% of surface area in a plane defined between the pair of side rails;
   a device to drive at least one of translation and rotation of the plurality of wet-traction members; and
   side retainers extending vertically from the side rails, wherein the side retainers comprise plastic or metal sheets or open meshes supported on foldable frames.

14. The device of claim 13, further comprising a removable floating net attached to the side retainers.

15. A water vehicle launch and recovery device comprising:
   a ramp having a forward portion and an aft portion and including a plurality of traction members for supporting at least a portion of a water vehicle;
   a pivotable connector for attaching the forward portion of the ramp to a vessel used in a launch or recovery process, wherein the pivotable connector is a dual, two axis pivotable connector or a three axis connector; and
   two or more floatation devices attached to the aft portion of the ramp, wherein the two or more floatation devices reduce relative heave motion of the aft portion of the ramp due to pitch motions and yaw interactions between waves and the vessel.

16. A water vehicle launch and recovery device comprising:
   a ramp having a forward portion and an aft portion and including a plurality of traction members for supporting at least a portion of a water vehicle, wherein the plurality of traction members comprise an inner support member and an elastomeric covering on an exterior surface of the inner support member;
   a pivotable connector for attaching the forward portion of the ramp to a vessel used in a launch or recovery process; and
   two or more floatation devices attached to the aft portion of the ramp, wherein the two or more floatation devices reduce relative heave motion of the aft portion of the ramp due to pitch motions and yaw interactions between waves and the vessel.

17. The device of claim 16, wherein the two or more floatation devices reduce lift of a lower end of the ramp relative to waves and heave motion of the vessel.

18. The device of claim 16, wherein the elastomeric covering comprises nitrile based rubber.

19. The device of claim 16, wherein the inner support member is formed of metal.

20. The device of claim 16, wherein the inner support member is formed of a composite material.

21. The device of claim 20, wherein the composite material includes at least one of glass fibers, polymer fibers, carbon fibers, and carbon nanotubes.

22. The device of claim 21, wherein the composite material further includes at least one of epoxy, vinylester, and polyester resins.

23. The device of claim 22, wherein the one or more ropes or cables include a plurality of fibers selected from the group consisting of aromatic polyester fibers, carbon fibers, steel fibers and glass fibers.

24. The device of claim 16, wherein the inner support member comprises one or more ropes or cables.

25. The device of claim 16 further comprising a floating open mesh connected to the ramp.

26. The device of claim 16 further comprising side retainers extending vertically from the ramp.

27. The device of claim 26, wherein the side retainers comprise plastic or metal sheets or open meshes supported on foldable frames.

28. The device of claim 27, further comprising a removable floating net attached to the side retainers.

29. The device of claim 16, wherein each of the plurality of wet-traction members is flexible to provide a soft landing for a recovered water vehicle.

30. The device of claim 29, wherein a portion of the plurality of wet-traction members provide about 10 to 15 inches of deflection under loading of the recovered vehicle.

31. A vessel for water vehicle launch and recovery, comprising:
   a hull having a forward portion, an aft portion, and a longitudinal axis extending between the forward and aft portions;
   an extendable ramp including a plurality of spaced traction members that can support at least a portion of a water vehicle; and
   a connector that attaches the extendable ramp to the aft portion of the vessel and allows the ramp to be rotatably positioned at an angle between 0 degrees and 50 degrees from the longitudinal axis, wherein each one of the plurality of spaced traction members comprises an inner support member and an elastomeric covering on an exterior surface of the inner support member.

32. The vessel of 31, wherein the elastomeric covering is located on an upper exterior surface.

33. The vessel of claim 31, wherein the elastomeric covering comprises nitrile based rubber.

34. The vessel of claim 31 further comprising side retainers extending vertically from the ramp.

35. The vessel of claim 31 further comprising a device to drive at least one of translation and rotation of the plurality of the spaced traction members.

36. The vessel of claim 35 further comprising a brake to control speed of translation or rotation of the plurality of the spaced traction members.

37. A method of recovering an underwater marine vehicle from a body of water, the method comprising:
   positioning a ramp extended from a hull of a recovery vessel at an incline of about 10 degrees to about 35 degrees, the ramp including a plurality of spaced traction members;
   lowering a rear portion of the ramp into the body of water; and
   supplying power to the plurality of spaced traction members to lift the underwater marine vehicle from the body of water to the recovery vessel without the use of a tow line.

38. The method of claim 37, further comprising:
activating a homing signal connected to the ramp.

39. The method of claim 37, further comprising:
raising side retainers attached to the ramp to retain the water underwater marine vehicle on the ramp during recovery.

40. The method of claim 37, wherein each one of the plurality of spaced traction members comprises an inner support member and an elastomeric covering on an exterior surface of the inner support member.

* * * * *

UNITED STATES PATENT AND TRADEMARK OFFICE
CERTIFICATE OF CORRECTION

PATENT NO. : 7,581,507 B2 Page 1 of 1
APPLICATION NO. : 11/773242
DATED : September 1, 2009
INVENTOR(S) : Kern It is certified that error appears in the above-identified patent and that said Letters Patent is hereby corrected as shown below:

In claim 39, at column 17, line 5, delete "water underwater marine vehicle" and replace it with --underwater marine vehicle--

Signed and Sealed this

First Day of December, 2009

David J. Kappos
*Director of the United States Patent and Trademark Office*